US012672097B2

(12) United States Patent
Khirallah et al.

(10) Patent No.: US 12,672,097 B2
(45) Date of Patent: Jun. 30, 2026

(54) METHOD AND APPARATUS FOR SATELLITE ACCESS IN A WIRELESS COMMUNICATION SYSTEM

(71) Applicant: Samsung Electronics Co., Ltd., Gyeonggi-do (KR)

(72) Inventors: Chadi Khirallah, Middlesex (GB); Mahmoud Watfa, Middlesex (GB); Lalith Kumar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 316 days.

(21) Appl. No.: 18/366,905

(22) Filed: Aug. 8, 2023

(65) Prior Publication Data
US 2024/0049171 A1 Feb. 8, 2024

(30) Foreign Application Priority Data

| | | |
|---|---|---|
| Aug. 8, 2022 | (IN) | 202231045244 |
| Jun. 8, 2023 | (GB) | 2308581 |

(51) Int. Cl.
*H04W 64/00* (2009.01)
*H04W 76/27* (2018.01)
*H04W 84/06* (2009.01)

(52) U.S. Cl.
CPC ......... *H04W 64/006* (2013.01); *H04W 76/27* (2018.02); *H04W 84/06* (2013.01)

(58) Field of Classification Search
CPC .... H04W 64/006; H04W 76/27; H04W 84/06
See application file for complete search history.

(56) References Cited

U.S. PATENT DOCUMENTS

| | | | | |
|---|---|---|---|---|
| 2023/0012328 A1* | 1/2023 | Kumar | .................. | H04W 76/25 |
| 2024/0224217 A1* | 7/2024 | Pan | ...................... | H04B 7/1853 |
| 2025/0063538 A1* | 2/2025 | Zhang | ............... | H04W 52/0241 |
| 2025/0088925 A1* | 3/2025 | Niu | ........................ | H04W 68/02 |

FOREIGN PATENT DOCUMENTS

| | | |
|---|---|---|
| CN | 114630366 | 6/2022 |
| WO | WO 2023/010336 | 2/2023 |
| WO | WO 2023/011601 | 2/2023 |
| WO | WO 2023/015132 | 2/2023 |
| WO | WO 2023/015151 | 2/2023 |
| WO | WO 2023/042861 | 3/2023 |

(Continued)

OTHER PUBLICATIONS

3GPP TR 23.700-28, "Study on Integration of satellite components in the 5G architecture; Phase 2", v0.3.0 (May 2022) (Year: 2022).*

(Continued)

*Primary Examiner* — Charles R Craver
(74) *Attorney, Agent, or Firm* — The Farrell Law Firm, P.C.

(57) ABSTRACT

The disclosure relates to a 5G or 6G communication system for supporting a higher data transmission rate. A method performed by a base station in a wireless communication system includes identifying that a user equipment (UE) is out of a coverage of a satellite due to a discontinuous coverage (DC), and transmitting, to a network entity managing a mobility of the UE, a UE context release request message including a cause value for a UE context release.

6 Claims, 12 Drawing Sheets

(56)  References Cited

FOREIGN PATENT DOCUMENTS

WO      WO 2023/048263      3/2023
WO      WO 2023/131261      7/2023

OTHER PUBLICATIONS

3GPP TS 23.401, "General Packet Radio Service (GPRS) enhancements for Evolved Universal Terrestrial Radio Access Network (E-UTRAN) access", v17.5.0 (Jun. 2022) (Year: 2022).*
Rakuten Mobile Inc, "Support for Discontinuous Coverage NB IoT NTN", R2-2201620, 3GPP TSG RAN WG2 meeting #116bis-e, Jan. 17-25, 2022, 4 pages.
ZTE Corporation, Sanechips, "Control Plane Aspects of IoT Over NTN", R2-2103342, 3GPP TSG-RAN WG2 Meeting #113 bis e-meeting, Apr. 12-20, 2021, 8 pages.
MediaTek Inc., "Discontinuous Coverage Open Issues Input", R2-2203521, 3GPP TSG-RAN WG2 Meeting #117-e, Feb. 21-Mar. 3, 2022, 21 pages.
Samsung, "Enhancements to Discontinuous Coverage", R2-2305785, 3GPP TSG RAN WG2 Meeting #122, May 22-26, 2023, 5 pages.
3GPP TR 23.700-28 V0.3.0, 3GPP, 3rd Generation Partnership Project; Technical Specification Group Services and System Aspects; Study on Integration of Satellite Components in the 5G Architecture; Phase 2 (Release 18), May 2022, 52 pages.
British Office Action dated Nov. 30, 2023 issued in counterpart application No. 2308581.4, 8 pages.
European Search Report dated Jan. 19, 2024 issued in counterpart application No. 23190129.9-1206, 7 pages.

* cited by examiner

301

UE receives info related to satellite's fly-over time, and/or any other timing information related to satellite coverage. 335

UE is trying to initiate an RRC Procedure 340

UE determines insufficient time to complete RRC procedure 345

UE does not to trigger RRC procedure, remains in current RRC mode/state, and wait for next available flyover time period. 350

302

UE receives info related to satellite's fly-over time, and/or any other timing information related to satellite coverage. ~375

UE moves to RRC_IDLE mode ~380

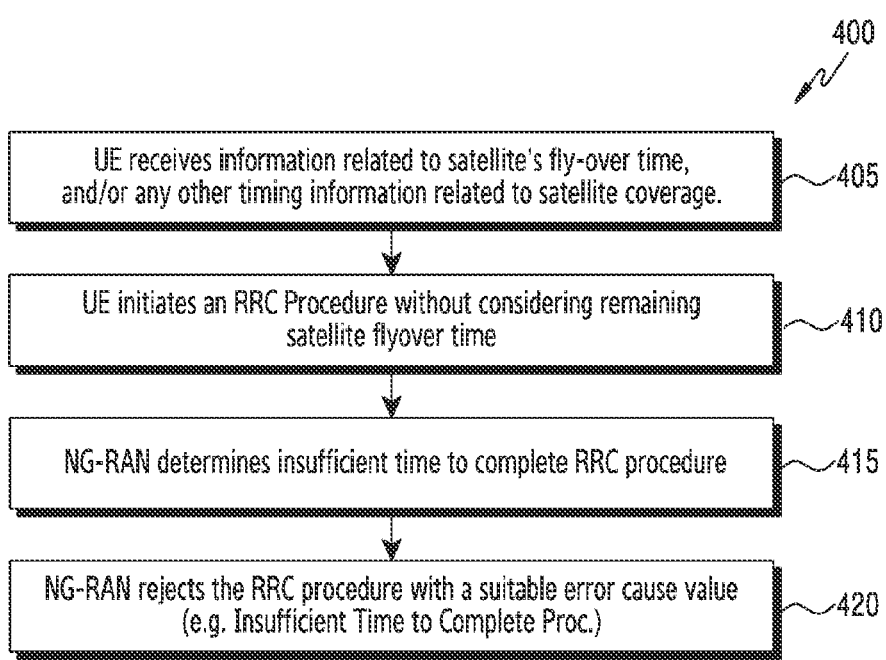

400

UE receives information related to satellite's fly-over time, and/or any other timing information related to satellite coverage. ~405

UE initiates an RRC Procedure without considering remaining satellite flyover time ~410

NG-RAN determines insufficient time to complete RRC procedure ~415

NG-RAN rejects the RRC procedure with a suitable error cause value (e.g. Insufficient Time to Complete Proc.) ~420

FIG.4

METHOD AND APPARATUS FOR SATELLITE ACCESS IN A WIRELESS COMMUNICATION SYSTEM

CROSS-REFERENCE TO RELATED APPLICATION(S)

This application is based on and claims priority under 35 U.S.C. § 119 to Indian Patent Application No. 202231045244, filed on Aug. 8, 2022, in the India Intellectual Property Office, and United Kingdom Patent Application No. 2308581.4, filed on Jun. 8, 2023, in the United Kingdom Intellectual Property Office, the disclosures of each of which are incorporated herein by reference in their entireties.

BACKGROUND

1. Field

The disclosure relates generally to wireless communication system, and more particularly, to a method and an apparatus for a satellite access in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

Accordingly, an aspect of the disclosure is to provide a method at least alleviates the problem of wasted power and unnecessary signalling overhead between the UE and the network, as a result of incomplete communication procedures.

An aspect of the disclosure is to address the matter of supporting DC without excessive UE power consumption and failures.

An aspect of the disclosure is to address the UE behavior if it deactivates its access stratum functions in order to optimise power consumption until coverage returns.

An aspect of the disclosure is to determine the network behavior when the UE informs the network that it needs to change RRC states.

An aspect of the disclosure is to determine the network behavior when an NAS message is received but the flyover time is insufficient.

An aspect of the disclosure is to determine the UE behavior when the UE deactivates its access stratum functions in order to optimise power consumption until coverage returns.

An aspect of the disclosure is to determine the network behavior when rejecting an RRC procedure request from the UE in the case of DC.

An aspect of the disclosure is to determine the network behavior if the UE informs the network that it needs to change RRC state, such as moving to the RRC IDLE mode, due to predicted loss of coverage.

An aspect of the disclosure is to determine the network behavior when the network receives an NAS message to be forwarded to the core network but the discontinuous coverage is about to begin.

In accordance with an aspect of the disclosure, a method performed by a base station in a wireless communication system includes identifying that a user equipment (UE) is out of a coverage of a satellite due to a discontinuous coverage (DC) and transmitting, to a network entity managing a mobility of the UE, a UE context release request message including a cause value for a UE context release.

In accordance with an aspect of the disclosure, a base station in a wireless communication system includes a transceiver and a controller coupled with the transceiver and configured to identify that a user equipment (UE) is out of a coverage of a satellite due to a discontinuous coverage (DC) and transmit, to a network entity managing a mobility of the UE, a UE context release request message including a cause value for a UE context release.

In accordance with an aspect of the disclosure, a method performed by a network entity managing a mobility of a UE in a wireless communication system includes receiving, from a base station, a UE context release request message including a cause value for a UE context release in case that the UE is out of a coverage of a satellite due to a DC.

In accordance with an aspect of the disclosure, a network entity managing a mobility of a UE in a wireless communication system includes a transceiver, and a controller coupled with the transceiver and configured to receive, from a base station, a UE context release request message including a cause value for a UE context release in case that the UE is out of a coverage of a satellite due to a DC.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an NG-RAN behavior according to an embodiment;

DETAILED DESCRIPTION

Figure 1:
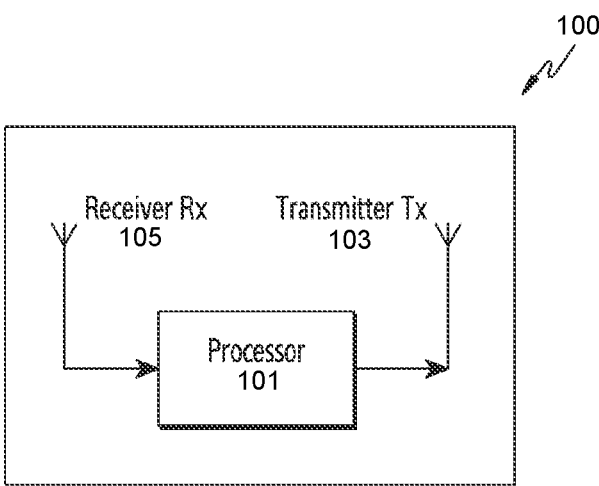
FIG. 1 is a block diagram of a UE to which the disclosure is applied.

Hereinafter, embodiments of the disclosure are described in detail with reference to the accompanying drawings.

In describing the embodiments, technical contents well known in the technical field to which the disclosure pertains and which are not directly related to the disclosure will be omitted for the sake of clarity and conciseness.

The same or similar components may be designated by the same or similar reference numerals, although they may be illustrated in different drawings.

The terms and words used herein are not limited to the bibliographical or standard meanings, but are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, or example are to be understood to be applicable to any other aspect, embodiment, or example disclosed herein unless incompatible therewith.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made.

The following examples are related to 3$^{rd}$ Generation Partnership Project (3GPP) 5G. However, one skilled in the art will appreciate that the techniques disclosed herein are not limited to these examples or to 3GPP 5G, and may be applied in any suitable system or standard, such as one or more existing and/or future generation wireless communication systems or standards or any existing or future releases of 3GPP 5G NR or any other relevant standard.

For example, the functionality of the various network entities and other features disclosed herein may be applied to corresponding or equivalent entities or features that perform the same or similar role, function, operation or purpose within the network.

One skilled in the art will appreciate that the disclosure is not limited to the specific examples taught herein. For example:

The techniques disclosed herein are not limited to 3GPP 5G.

One or more entities in the examples disclosed herein may be replaced with one or more alternative entities performing equivalent or corresponding functions, processes or operations.

One or more of the messages disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

For a UE in a communications network using a satellite to access the network, a method herein includes verifying whether a communication process between the UE and the satellite can be completed before expiration of a flyover time of the satellite or can not be completed before expiration of a flyover time of the satellite.

The above is a general UE behaviour of the present disclosure. The following describes details that can be used to achieve the above aspect. These details are examples only and they may be used in any combination or order.

The method at least alleviates the problem of wasted power and unnecessary signalling overhead between the UE and the network, as a result of incomplete communication procedures.

Certain examples of the present disclosure provide various techniques relating to enhancements for UE-satellite access within 3GPP 5G communication networks using such access.

The 3$^{rd}$ Generation Partnership Project (3GPP) is developing solutions for the use of satellite access for connecting UEs, such as IoT devices, to core networks, such as the evolved packet core (EPC).

One of the related aspects of this satellite use is discontinuous coverage (DC), in which a satellite's coverage is not always available for a UE, and hence it's satellite access is discontinuous. The lack of availability of satellite coverage for a UE is due to the movement of the satellite around the planet. When the satellite is near the UE, the UE will have coverage from the satellite. When the satellite is moving around the planet, a certain time being required for a full circle to be made, the UE will not have coverage from the satellite. When the satellite is again near the UE, the UE will have coverage from the satellite. In the presence of the satellite, and hence coverage, the concept of fly-over time is discussed which is basically the duration of time for which coverage is available to the UE. As an example, a satellite may take hours (10 hrs, as an example) to go around the Earth at a certain orbit or distance. A satellite may have a fly-over time for a UE on Earth of only minutes (2 mins, as an example) and the UE on Earth will only detect coverage every 10 hrs.

Additionally, when using satellite communication, a UE will not be able to send any message if it does not have the satellite location or position. The time needed to do so is referred to as Time To First Fix (TTFF). The duration of TTFF depends on the state of the UE receive function, which may be one of three states: cold, warm, or hot. The 3GPP RAN2 working group has assumed certain example values, such that from a cold state, the global navigation satellite system (GNSS) fix can take up to 100 s, from a warm state, 50 s and from hot state, 2 s.

It should be noted that when a UE is using satellite access, the network access server (NAS) timers that guard the NAS procedures are extended, so as to give enough time for lower layer transmissions of the UE to succeed and for a response to arrive at the UE from a message recipient. For example, the timer T3517 (in N1 mode) for the service request procedure (for which, for example, the UE sends the Service Request message) is 15 s when the UE is not using satellite access. However, when satellite access is used, this timer is set to 27 s. This is because the lower layer transmissions in satellite access are expected to require more time to transmit a message. Setting the timer to 15 s would lead to an early failure of the NAS procedure, even if the response message may well be received a few seconds after the 15 s time mark. To avoid this, the NAS timers have been extended in TS 24.301 and TS 24.501. The NAS timers may have different names in S1 mode compared to N1 mode and may also have different values depending on whether the UE is using narrow band or wide band, etc.

The following problems have been identified. Consider the following example: assume a satellite's flyover time starts at T1 and it is expected to last until T1+60 s. At time T2, which is, say, equal to T1+50 s, i.e. 50 s into the flyover time, the satellite is expected to provide coverage for an additional 10 s. A UE in idle mode may have data or signalling to send at T2. This means that the UE only has 10 s left to complete the service request procedure, for which the NAS timer is to be set at 27 s. The remaining 10 s of flyover time would likely be insufficient for the completion of the NAS procedure. The NAS procedure will therefore almost be guaranteed to be unsuccessful due to lack of enough coverage time. A failed NAS procedure means that the UE would have wasted power in the NAS procedure. Note that, as mentioned earlier, the NAS timers may be different in S1 mode and also the timer values may be different and can be longer than the example used here.

In RAN #96 meeting, 3GPP approved a new WI for IoT (Internet of Things) NTN (non-terrestrial network) enhancements [1]. The following are some of the main objectives in this WI:

Specify the following IoT NTN specific enhancements not covered by NR_NTN_Solutions WI agreements, according to Section 8 in TR 36.763:

Architecture:

Support for EPC

Mobility and Tracking Area:

. . .

Support of legacy (Rel-16) cell selection/reselection mechanisms without major enhancements. Minor adjustments to existing mobility mechanisms, such as a new parameter values, change to timing etc. can be considered to adapt functionality to NTN.

Support of legacy (Rel-16) Handover and RLF/reestablishment mechanisms without major enhancements. For eMTC, Rel-16 LTE CHO procedure can be considered without major enhancements. Minor adjustments to existing mobility mechanisms, such as a new parameter values, change to timing etc. can be considered to adapt functionality to NTN.

Others:

Support of discontinuous coverage without excessive UE power consumption and without excessive failures/recovery actions. Minor enhancements to the existing power saving mechanisms e.g. DRX, PSM, eDRX, relaxed monitoring, and (G)WUS can be considered, and if found needed, specified, to support discontinuous coverage;

In discontinuous coverage (DC) scenarios, the satellite's coverage may only be visible to the UE during so called satellite's fly-over time. Example of flyover times and coverage times can be found in [2].

Consequently, it is expected that signalling between the UE and the network maybe impacted, due to in insufficient flyover time to complete a given procedure in discontinuous coverage scenario.

Moreover, 3GPP is also working on the specification of the idle mode procedures for the UE when the scenario of discontinuous coverage (DC) is used in the network. According to TS 23.401, the following requirement is mentioned in relation to the deactivation of the access stratum due to DC:

For UE using a RAN that provides discontinuous coverage (e.g. for satellite access with discontinuous coverage), if the UE knows how the E-UTRAN coverage varies with time based on information defined in TS 36.331 (e.g. from the ephemeris data of a satellite access system that the UE is using) then the UE may deactivate its Access Stratum functions in order to optimise power consumption until coverage returns. Details are specified in TS 36.304 and TS 24.301 [46].

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) bands including 28 GHz and 39 GHz. In addition, it has been considered to implement sixth generation (6G) mobile communication technologies referred to as beyond 5G systems in terahertz (THz) bands, such as 95 GHz to 3 THz bands, to achieve transmission rates fifty times faster than 5G mobile communication technologies and ultra-low latencies one-tenth of 5G mobile communication technologies.

At the outset of the 5G mobile communication technology development, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Moreover, there has been ongoing standardization in air interface architecture/protocol regarding technologies such as the industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access channel for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), and mixed reality (MR), 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional multiple input multiple output (FD-MIMO), array antennas and large-scale antennas, metamaterial-based lenses and antennas for improving coverage of terahertz band signals, high-dimensional space multiplexing technology using orbital angular momentum), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Thus, there is a need in the art to address the matter of supporting DC without excessive UE power consumption and failures.

There is also a need in the art to address the UE behavior if it deactivates its access stratum functions in order to optimise power consumption until coverage returns.

As discussed above, there is a problem of wasted power and unnecessary signalling overhead between the UE and the network, due to incomplete communication procedures. As such, there is a need in the art for a method and apparatus that can cure these problems.

The above information is presented as background information only to assist with an understanding of the present disclosure. No determination has been made, and no assertion is made, as to whether any of the above might be applicable as prior art with respect to the present invention.

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims. Embodiments or examples disclosed in the description and/or figures falling outside the scope of the claims are to be understood as examples useful for understanding the present invention.

Other aspects, advantages, and salient features of the invention will become apparent to those skilled in the art from the following detailed description taken in conjunction with the accompanying drawings.

According to one aspect of the present disclosure there is provided for a UE in a communications network using a satellite to access the network, a method comprising verifying if a communication process between the UE and the satellite can be completed before expiration of a flyover time of the satellite or can not be completed before expiration of a flyover time of the satellite.

The communication process may be a process initiated by the UE. The communication process may be a process initiated by the UE on receipt of a message from the network.

The communication process may comprise a NAS communication procedure. The communication process may comprise initiation of a NAS procedure. The communication process may comprise completion of a NAS procedure.

Completion of the communications process before expiration of the flyover time of the satellite may comprise the UE transmitting a message to the network. Completion of the communications process before expiration of the flyover time of the satellite may further comprise the UE receiving an expected response message from the network.

Verifying if the communication process can or cannot be completed before expiration of a flyover time of the satellite may use at least one time value. The time value may comprise a time period before a NAS timer expires. The time value may comprise a remaining time period between a current time and an expiration time of the flyover time. The time value may comprise a time period for completion of the communication process.

Verifying that the communication process can be completed before expiration of a flyover time of the satellite may comprise determining that the time value comprising the remaining time period is greater than the time value comprising the time period for completion of the communication process.

The time value may comprise a minimum time period. Verifying that the communication process can be completed before expiration of a flyover time of the satellite may comprise determining that the time value comprising the remaining time period is greater than or equal to the time value comprising the minimum time period.

The minimum time period may be received by the UE from the network. The minimum time period may be part of the UE subscription information. The minimum time period may be determined by the UE.

FIG. 1 is a block diagram of a UE to which the disclosure is applied. The network entity illustrated in FIG. 1 may be implemented as a network element on a dedicated hardware, as a software instance running on a dedicated hardware, or as a virtualised function instantiated on an appropriate platform, such as on a cloud infrastructure.

The UE 100 comprises a processor (or controller) 101, a transmitter (Tx) 103 and a receiver (Rx) 105. The receiver 105 is configured to receive one or more messages from one or more other entities of the communications network and the satellite. The transmitter 103 is configured to transmit one or more messages to one or more other entities of the communications network and the satellite. The processor 101 is configured perform operations as described below.

The flyover time of the satellite may be a time period within which the satellite provides coverage for the UE. The expiration of the flyover time of the satellite may be a time at which a DC event occurs.

The method may comprise the UE verifying that the communication process can be completed and then initiating the communication process.

The method may comprise the UE verifying that the communication process cannot be completed and then determining not to initiate the communication process. This may be the case even if satellite access/coverage is still available, or even if the remaining satellite flyover time is not zero, or even if a next satellite DC event has not yet started.

The method may comprise the UE verifying that the communication process cannot be completed and any of keeping UE access stratum functions deactivated, deactivating UE access stratum function, remaining in idle mode, entering idle mode optionally by the UE locally releasing its NAS signalling connection, staying in current mode, remaining in power saving mode, activating power saving mode, starting a timer to guard the release of the NAS signalling connection by the network (e.g. starting T3540 in 5G or the equivalent in LTE e.g. T3440) and after the expiry of which the UE may then enter idle mode.

The communication process may be a process initiated by the UE. The communication process may be a process initiated by the UE on receipt of a message from the network. The message from the network may comprise a page. The UE may receive a page and verify whether a response to the page can be completed before expiration of a flyover time of the satellite or cannot be completed before expiration of a flyover time of the satellite.

The communication process may comprise a NAS procedure. The communication process may comprise initiation of a NAS procedure. The communication process may comprise completion of a NAS procedure. The NAS procedure may be a NAS message. The NAS message may be a NAS request. The NAS message may be NAS signalling. The NAS signalling may be for any of sending data, requesting resources for data. The communication procedure may be a RRC procedure. The RRC procedure may be a RRC message. The RRC procedure may be RRC signalling.

Completion of the communication process before expiration of the flyover time of the satellite may comprise the UE transmitting a message to the network. Completion of the communication process before expiration of the flyover time of the satellite may further comprise the UE receiving an expected response message from the network.

Completion of a communication process comprising a NAS procedure before expiration of the flyover time of the satellite may comprise transmission of a NAS message to the network. Completion of a communication process comprising a NAS procedure before expiration of the flyover time of the satellite may further comprise receiving an expected response message from the network. The expected response message may be a NAS response message.

In one embodiment, the NAS procedure may be a Registration Request message and the expected response message may be a NAS response message comprising any of a Registration Accept, a Registration Reject. In another embodiment, in LTE (i.e. S1 mode), the NAS procedure may comprise a Service Request message and the expected response message may be any NAS message, such as any of a Security Mode Command message, indication from UE lower layers that bearers have been established, or any other method that is known to be an indication of the success of the NAS procedure in question.

The method may comprise verifying if the communication process can or cannot be completed before expiration of a flyover time of the satellite by using at least one time value.

The time value may comprise a time period before a NAS timer expires.

The time value may comprise a remaining time period, T_rem, between a current time and an expiration time of the flyover time. This is basically the time period in which the satellite coverage remains available and hence the UE can (at least in theory) initiate the communication process. The method may comprise determination of the expiration time of the flyover time. This may be equivalent to determination of a start time of a next DC event.

The time value may comprise a time period for completion of the communication process.

The method may comprise verifying that the communication process can be completed before expiration of a flyover time of the satellite by determining that the time value comprising the remaining time period is greater than the time value comprising the time period for completion of the communication process.

The time period for completion of the communication process may comprise a time period between a start of a communication procedure of the communication process and an end of the communication procedure. The communication procedure may comprise transmission of a message by the UE. The time period for completion of the communication process may further comprise a time period for the UE to be in a state which permits start of a communication procedure of the communication process.

The time period for the UE to be in a state which permits start of a communication procedure of the communication process may be zero. This may occur if the UE is already in a state which permits the UE to start the communication procedure.

The method may comprise determination of whether the UE is in a state which permits start of the communication procedure. This may comprise any of:

the UE's lower layers are such that they are ready to start the communication procedure without needing any GNSS fix time, or without needing Time To First Fix (TTFF), the UE is in 5GMM-CONNECTED mode (or EMM-CONNECTED mode), or 5GMM-CONNECTED mode with RRC inactive indication, the UE is in 5GMM-IDLE mode (or EMM-IDLE mode), or in 5GMM-IDLE mode with suspend indication (EMM-IDLE mode with suspend indication), the UE is in RRC-CONNECTED state or RRC-INACTIVE state, the UE is in RRC-IDLE state, Any combinations of the above may apply, however what is important is that the UE's lower layers do not need additional time to be ready to start the communication procedure.

The time period for the UE to be in a state which permits start of a communication procedure of the communication process may be non-zero. The method may comprise determining the non-zero time period for the UE to be in a state which permits start of the communication procedure.

The UE may not be in a state which permits start of the communication procedure as the UE needs time for the lower layers thereof to start the communication procedure. For example, the UE may need a non-zero time period to start the communication procedure due to GNSS fix time (or Time To First Fix) due to the UE being, e.g. in cold state, warm state, hot state, etc.

The UE should consider the time required by the lower layers of the UE to be in a certain state which permits the communication procedure, which may comprise transmission of a message. For example, the UE may consider the time required to enter a RRC-CONNECTED state from any state that the UE may currently be in e.g. a RRC-IDLE state. As such, when determining if there is sufficient time to complete the communication process, e.g. sending a NAS message or initiating a NAS procedure, the UE may consider at least one aspect such as those listed herein e.g. time to fix, time to be in a RRC-CONNECTED state, remaining flyover time, etc.

The time value may comprise a minimum time period, T_min.

The method may comprise verifying that the communication process can be completed before expiration of a flyover time of the satellite by determining that the time value comprising the remaining time period is greater than the time value comprising the minimum time period. The method may comprise verifying that the communication process can be completed before expiration of a flyover time of the satellite by determining that the time value comprising the remaining time period is equal to the time value comprising the minimum time period.

When this is the case, the UE can initiate the communication process.

The method may comprise verifying that the communication process cannot be completed before expiration of a flyover time of the satellite by determining that the time value comprising the remaining time period is less than the time value comprising the minimum time period.

When this is the case, the UE will not initiate the communication process.

The above proposals may apply to a UE in any NAS mode e.g. idle mode, connected mode, idle mode with suspend indication, or connected mode with RRC inactive indication (which only applies to N1 mode i.e. 5GS).

Herein, it is noted that an NAS idle mode may refer to an evolved packet system (EPS) mobility management (EMM)-IDLE mode (in the S1 mode), or 5GMM-IDLE mode (in N1 mode), an NAS idle mode with a suspend indication may refer to the EMM-IDLE mode with a suspend indication, or the 5MM-IDLE mode with a suspend indication, an NAS connected mode may refer to the EMM-CONNECTED mode or 5GMM-CONNECTED mode, and an NAS connected mode with RRC inactive indication may refer to the 5GMM-CONNECTED mode with an RRC inactive indication.

The above also apply to a UE in the S1 mode (i.e., EPS) or to a UE in N1 mode (i.e., 5GS). Herein, the UE may be in state or substate of the REGISTERED or DEREGISTERED state in either the N1 mode or S1 mode.

Figure 2:
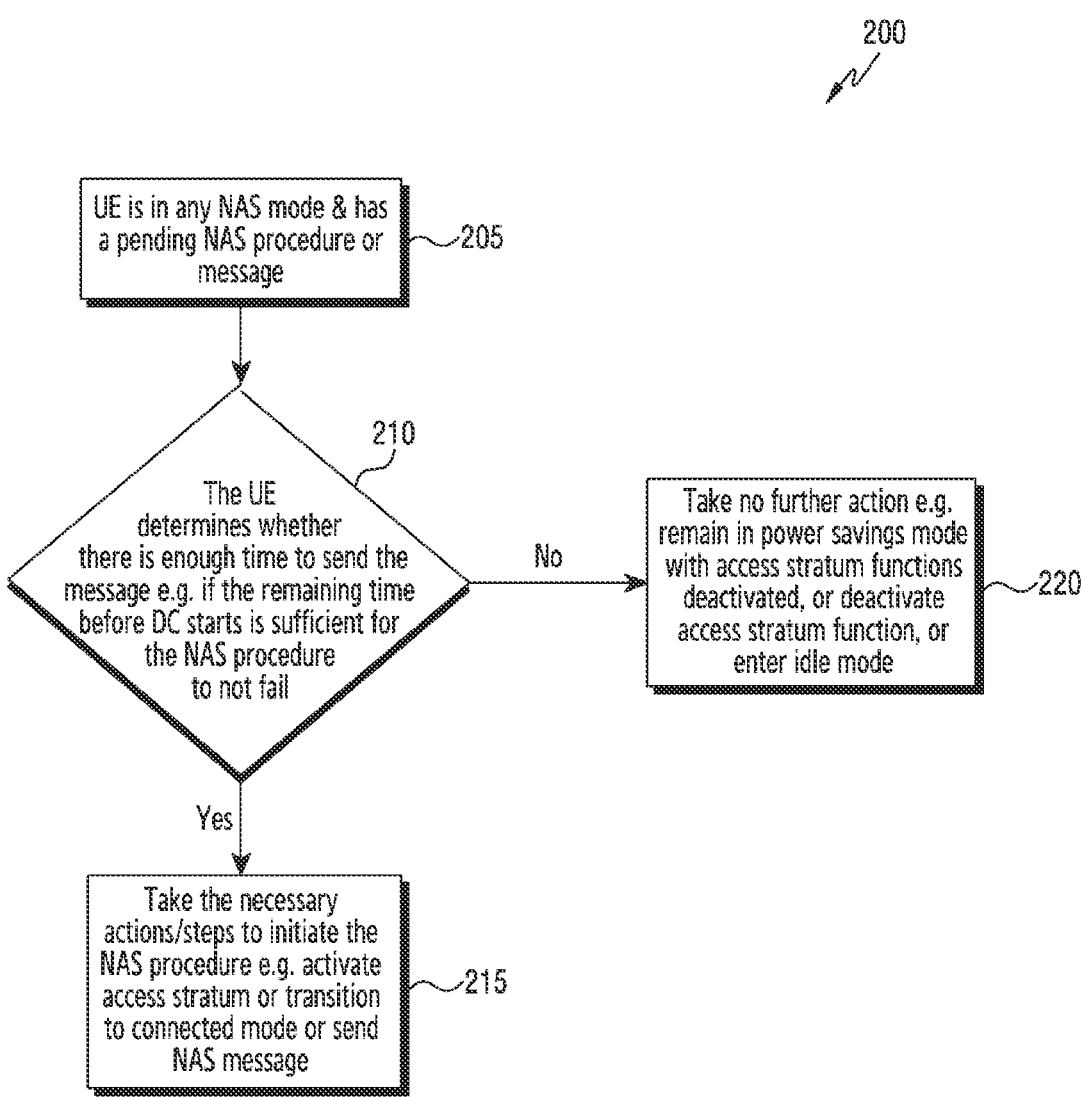
FIG. 2 illustrates a method of sending an NAS message in a communication process according to an embodiment.

FIG. 2 illustrates a method of sending an NAS message in a communication process according to an embodiment.

In step 205, the UE is in any NAS mode and has a pending NAS procedure or message.

In step 210, the UE determines whether there is sufficient time to send the message, such as whether the remaining time before DC starts is sufficient for the NAS procedure to succeed.

In step 215, if it is determined in step 210 that there is sufficient time, the UE takes the necessary actions to initiate the NAS procedure, such as activating an access stratus, transitioning to the connected mode, or sending the NAS message.

In step 220, if it is determined in step 210 that there is insufficient time, the UE takes no further action by remaining in power saving mode with access stratum functions deactivated, deactivating the access stratum function, or entering the idle mode.

In more detail, the method includes the UE determining that the communication process cannot be completed and then determining not to initiate the communication process. This may be the case even if satellite access/coverage is still available, the remaining satellite flyover time is not zero, or a next satellite DC event has not yet begun.

The method includes the UE determining that the communication process cannot be completed and any of maintaining UE access stratum functions deactivated, deactivating UE access stratum function, remaining in the idle mode, entering idle mode optionally by the UE locally releasing its NAS signalling connection, remaining in a current mode, remaining in a power saving mode, activating the power saving mode, and starting a timer to guard the release of the NAS signalling connection by the network and after the expiry of which the UE may then enter the idle mode.

The communication process may be initiated by the UE on receipt of a message from the network. The message from the network includes a page. The UE may receive a page and verify whether a response to the page can be completed before expiration of a flyover time of the satellite.

The communication process includes initiation and completion of an NAS procedure. The NAS procedure may be an NAS message. The NAS message may be an NAS request or an NAS signalling. The NAS signalling may be for any of sending data or requesting resources for data. The communication procedure may be an RRC procedure. The RRC procedure may be an RRC message or RRC signalling.

Completion of the communication process before expiration of the flyover time of the satellite includes the UE transmitting a message to the network and the UE receiving an expected response message from the network.

Completion of a communication process comprising an NAS procedure before expiration of the flyover time of the satellite includes transmission of an NAS message to the network and receiving an expected response message from the network. The expected response message may be an NAS response message.

The NAS procedure may be a registration request message and the expected response message may be an NAS response message comprising any of a registration accept or a registration reject message. In LTE (i.e., S1 mode), the NAS procedure includes a service request message and the expected response message may be any NAS message, such as any of a security mode command message, indication from UE lower layers that bearers have been established, or any other method that is known to be an indication of the success of the NAS procedure in question.

The method may comprise verifying whether the communication process can or cannot be completed before expiration of a flyover time of the satellite by using at least one time value.

The time value may comprise a time period before an NAS timer expires. The time value may comprise a remaining time period, T_rem, between a current time and an expiration time of the flyover time. This is basically the time period in which the satellite coverage remains available and hence the UE can initiate the communication process. The method may comprise determination of the expiration time of the flyover time. This may be equivalent to determination of a start time of a next DC event.

The time value may comprise a time period for completion of the communication process. The method may comprise determining that the communication process can be completed before expiration of a flyover time of the satellite by determining that the time value comprising the remaining time period is greater than the time value comprising the time period for completion of the communication process.

The time period for completion of the communication process may comprise a time period between a start of a communication procedure of the communication process and an end of the communication procedure. The communication procedure may comprise transmission of a message by the UE. The time period for completion of the communication process may further comprise a time period for the UE to be in a state which permits start of a communication procedure of the communication process. The time period for the UE to be in a state which permits start of a communication procedure of the communication process may be zero. This may occur if the UE is already in a state which permits the UE to start the communication procedure.

The method may comprise determination of whether the UE is in a state which permits start of the communication procedure. This may comprise any of the UE's lower layers being ready to start the communication procedure without needing any GNSS or Time To First Fix (TTFF) fix time, the UE being in 5GMM-CONNECTED mode (or EMM-CONNECTED mode), or 5GMM-CONNECTED mode with RRC inactive indication, the UE being in 5GMM-IDLE mode (or EMM-IDLE mode), or in 5GMM-IDLE mode with a suspend indication (EMM-IDLE mode with a suspend indication), the UE being in an RRC-CONNECTED state or RRC-INACTIVE state, or the UE being in the RRC-IDLE state.

Any combinations of the above may apply, so long as the UE's lower layers do not need additional time to be ready to start the communication procedure. The time period for the UE to be in a state which permits start of a communication procedure of the communication process may be non-zero. The method may comprise determining the non-zero time period for the UE to be in a state which permits start of the communication procedure.

The UE may not be in a state which permits start of the communication procedure as the UE needs time for the lower layers thereof to start the communication procedure. For example, the UE may need a non-zero time period to start the communication procedure due to GNSS fix time (or Time To First Fix) due to the UE being, e.g. in cold state, warm state, hot state, etc.

The UE should consider the time required by the lower layers of the UE to be in a certain state which permits the communication procedure, which may comprise transmission of a message. For example, the UE may consider the time required to enter an RRC-CONNECTED state from any state that the UE may currently be in e.g., an RRC-IDLE state. As such, when determining whether there is sufficient time to complete the communication process, e.g., sending an NAS message or initiating an NAS procedure, the UE may consider at least one aspect such as those listed herein e.g., time to fix, time to be in an RRC-CONNECTED state, remaining flyover time, etc. The time value may comprise a minimum time period, T_min.

The method may comprise determining that the communication process can be completed before expiration of a flyover time of the satellite by determining that the time value comprising the remaining time period is greater than or equal to the time value comprising the minimum time period. In this case, the UE can initiate the communication process.

The method may comprise determining that the communication process cannot be completed before expiration of a flyover time of the satellite by determining that the time value comprising the remaining time period is less than the time value comprising the minimum time period. In this case, the UE will not initiate the communication process.

When the time value comprising the minimum time period, T_min, is used in the method, the UE should ensure that the minimum time period is known and/or well determined to determine whether the communication process can be completed.

The minimum time period may comprise a value of an NAS timer or a fraction of the value of the NAS timer which is associated with the transmission of the NAS message. The minimum time period may be a predetermined minimum time period, a time period associated with a mobility management message, or a time period associated with a session management message.

The minimum time may also indicate that the UE should also consider the time required by the lower layers to be in a certain state which permits the transmission of a message. For example, the UE may consider the time required to enter RRC-CONNECTED state from any state that the UE may currently be in, such as the RRC-IDLE state. As such, when determining whether there is sufficient time to send an NAS message or initiate an NAS procedure, the UE may consider at least one aspect such as those listed herein, such as a time to fix, a time to be in RRC-CONNECTED state, and a remaining flyover time.

The minimum time period may be received by the UE from the network in an NAS message such as any of a registration accept, an attach accept, a configuration update command, a service accept, a protocol data unit (PDU) session establishment accept message, and any similar message that is used in EPS. The NAS message may be any new or existing message such as at least one of an NAS mobility management message or an NAS session management message. The minimum time period may be received by the UE from the network in any of a container, a policy container, a part of steering information, a part of roaming information, and may be associated with any of an NAS mobility management message, NAS mobility management procedure, an NAS session management message or procedure. The minimum time period received by the UE from the network may be associated with a particular message type such as a registration request, a tracking area update request, and a service request.

The network may determine the minimum time period based on implementation details, knowledge of the discontinuous coverage time period, and/or consideration of a GNSS fix time required for the UE's lower layers to be ready for an access attempt on the satellite.

The minimum time period may be received by the UE from the network using any information element (IE) or NAS message. The network may do so when the UE indicates support for handling the minimum time period, support for behaving as described herein, or a new capability that is understood to imply a UE behavior in accordance with the disclosure. A UE which behaves in accordance with the disclosure herein should send such an indication to the network using any IE or NAS message such as a 5GMM capability IE in a registration request message, or any other similar IE that is sent in any EPS NAS message. The network also sends the minimum time period to the UE when subscription information of the UE indicates that the UE supports this feature, supports behaving in accordance with the disclosure, or when the subscription information contains at least one minimum time value for the UE.

When the UE receives the minimum time period, where this may be per NAS mobility management, or NAS session management, or both, the UE uses the minimum time period as previously described. Optionally, the UE may store the determined value until a new value is received or determined. Any new determined value may replace an existing determined and/or stored value in the UE.

If the minimum time period is per NAS procedure type, where the procedure may be related to either an NAS mobility management procedure or an NAS session management procedure, or both, or the minimum time period is per NAS message type, then the UE should act as follows. If the UE has an NAS procedure to initiate, then when verifying whether the UE should initiate the procedure, the UE should use the minimum time period that is associated with the NAS procedure or message, if such an association exists. Once the minimum time period has been determined, the UE uses the minimum time period to determine whether it can initiate the NAS procedure.

The remaining time period may be received by the UE from the network as described above with reference to the minimum time period.

The network may provide a timer value to the UE which is then used to determine whether there is sufficient time for completion of the communication process. For example, the UE may determine that there is sufficient time if the remaining time period of the flyover time is greater than or equal to the timer value received by the UE, and may determine that there is insufficient time if the remaining time period of the flyover time is smaller (or optionally equal to or smaller) than the timer value received by the UE.

The minimum time period may be part of UE subscription information, may be one value regardless of the NAS procedure, or may be per procedure or per message of the communication process, as described above. The network, e.g., access and mobility management function (AMF) entity and/or session management function (SMF) entity, may obtain the minimum time period from the UE subscription information. Once obtained, the network may provide the minimum time period to the UE as previously explained. The minimum time period may also be sent using any of an NAS message, a container, a policy container, a part of steering information, a part of roaming information.

The minimum time period may be provided to the UE by a home public land mobile network (HPLMN directly using a container sent by the HPLMN in a secured manner. Once received in the UE, the UE uses the minimum time period as described herein.

The minimum time period may be determined by the UE. For example, the minimum time period, which may or may not be associated with a specific NAS procedure/message as of the communication process described above, may be configured in the UE. The UE uses this preconfigured information to determine the minimum time period and uses the minimum time period as described herein.

The UE may continue to store the minimum time period if it is using a network access that is not the satellite access, after the UE switches off, after the UE deregisters from the public land mobile network (PLMN), or when the UE changes a PLMN. Alternatively, the minimum time period may be deleted for any of the events listed and a new minimum time period may be used per PLMN once the UE registers to the PLMN. The minimum time period may be per PLMN or may apply for all PLMNs or only for satellite access. The foregoing may also apply to the remaining time period.

For RRC, the following problems have been identified. Increased Wastage of UE's Power and Resources Due to Procedure Failure with Insufficient Fly-Over (or Remaining Flyover)

Considering a DC scenario used in the network and assuming that a UE is in the process of triggering a RRC procedure to communicate with the network (e.g. NG-RAN). If the satellite's flyover time is insufficient to complete the desired RRC procedure, the UE would proceed to trigger this procedure without knowing that it will be interrupted (i.e. not completed) and fail due to the UE losing coverage of the satellite. Such RRC procedure failure results in wastage of UE's power and resources in the DC scenario.

For example, assuming that a UE is trying to re-establish RRC connection with an NTN NG-RAN node during a satellite flyover time in the order of minutes, and assuming that the UE initiates the RRC connection re-establishment procedure, and starts T311 timer, related to this procedure, at the last 10 seconds remaining of the satellite's fly-over time. In this case, according to TS 38.331, this RRC procedure will be interrupted (i.e. not completed) if the T311 timer value is set larger than ms10000:

---

UE-TimersAndConstants information element

---

```
-- ASN1START
-- TAG-UE-TIMERSANDCONSTANTS-START
UE-TimersAndConstants ::=        SEQUENCE {
    t311                         ENUMERATED {ms1000, ms3000, ms5000, ms10000, ms15000,
ms20000,ms30000},
    ...
}
```

This disclosure proposes solutions to avoid this problem and address the following question:

How to support discontinuous coverage without excessive UE power consumption and without excessive failures/recovery actions?

UE and/or Network Behavior if the UE Deactivates its Access Stratum Function

This disclosure proposes solutions to avoid this problem and address the following question:

What is the UE behaviour if it deactivates its Access Stratum functions in order to optimise power consumption until coverage returns?

RRC Procedure Failure Due to Loss of Satellite Coverage

Considering a DC scenario used in the network and assuming that a UE proceed to trigger a RRC procedure to communicate with the network without consideration of satellite's fly over time, the network may need to fail this procedure based on it knowledge of satellite's fly overtime.

However, the UE may not understand that the RRC procedure failure is due to insufficient flyover time and may attempt to repeat the RRC procedure. There is a need in the art for solutions to avoid this problem and address the issue of what the network behavior should be when rejecting an RRC procedure request from the UE in the case of DC. There is also a need in the art to determine the network behavior when the UE informs the network that it needs to change RRC states, such as moving to RRC IDLE, due to predicted loss of coverage.

In addition, there is a need in the art to determine the network behavior when an NAS message is received but the flyover time is insufficient, i.e., to determine the network behavior when receiving an NAS message to be forwarded to the core network but the discontinuous coverage is about to begin.

Moreover, when the UE determines whether there is sufficient coverage time before initiating an RRC procedure (signaling/message), there is a need in the art to know how to support DC without excessive UE power consumption and without excessive failures/recovery actions.

Additionally, there is a need in the art to determine the UE behavior when the UE deactivates its access stratum functions in order to optimise power consumption until coverage returns.

There is a further need in the art to determine the network behavior when rejecting an RRC procedure request from the UE in the case of DC.

There also exists a need in the art to determine the network behavior if the UE informs the network that it needs to change RRC state, such as moving to the RRC IDLE mode, due to predicted loss of coverage.

There is another need in the art to determine the network behavior when the network receives an NAS message to be forwarded to the core network but the discontinuous coverage is about to begin.

However, the UE may not understand that the RRC procedure failure is due to insufficient flyover time, and may try to repeat the RRC procedure again.

This disclosure proposes solutions to avoid this problem and address the following question:

What is the network behaviour when rejecting an RRC procedure request from the UE in the case of DC?

Network Behavior Following UE Indication/Decision of Insufficient Flyover Time to Complete Procedures This disclosure proposes solutions to avoid this problem and address the following question:

What is the Network behaviour if the UE informs the network that it needs to change RRC state (e.g. move to RRC IDLE) due to predicted loss of coverage?

Network Behavior Following when a NAS Message is Received but the Flyover Time is Insufficient This disclosure proposes solutions to avoid this problem and address the following question:

What is the Network behaviour if it receives a NAS message to be forwarded to the core network but the discontinuous coverage is about to start?

This disclosure proposes solutions to solve the problems indicated above.

The UE Verifies if there is Sufficient Coverage Time Before Initiating a RRC Procedure (Signaling/Message)

The solutions in this section address the following question from problem statement:

How to support discontinuous coverage without excessive UE power consumption and without excessive failures/recovery actions?

To avoid the problem of wasted power and unnecessary signalling overhead between the UE and the network, as a result of incomplete RRC procedure, during a satellite's flyover time, the UE should first determine whether there is sufficient time to complete the desired RRC procedure, before proceeding to initiate this procedure. For example, the UE may determine whether there is sufficient time for the RRC procedure to be completed before the related RRC timer expires, or determine whether there is sufficient time, i.e., that there is a certain minimum time duration before the start of the next DC event.

If the UE determines that there is sufficient time (as described above), the UE may initiate the RRC procedure.

The UE may determine not to initiate the procedure even if the satellite access/coverage is still available, the remaining flyover time is not zero, or DC has not yet begun. This may occur when the UE determines that there is insufficient time to complete the procedure.

In the case of multiple satellites visible to the UE, the network may configure the UE to consider the fly-over times for the multiple satellites in its decision on the sufficient time for initiating any RRC procedures. For example, the UE may select the satellite with the largest remaining fly-over time with which to trigger the RRC procedure.

The proposal above is the general new behaviour that is proposed by this disclosure. The proposals that follow would describe some details that can be used to achieve the proposal above. Note that these details are meant to be as examples rather than restrictions, and they may be used in any combination or order.

As disclosed herein, the UE may determine the start time of the DC based on information provided by the network (e.g., ephemeris and/or other system information broadcast and/or dedicated signalling).

The UE may also determine the remaining time before the start of the DC, i.e., the time that the satellite coverage is available and hence the UE can initiate an RRC procedure.

Examples of the UE behavior are as follows. If the UE is already in a state which permits the UE to transmit an RRC message, the UE may consider immediately initiating the RRC procedure.

The UE sends to the network indication of the UE capability to determine the remaining flyover time or to indicate to the network its capability to behave as described herein.

The UE sends to the network an indication of the UE capability to handle any updated values (or extensions) of RRC procedures timers that may be impacted by DC scenarios.

The UE sends to the network an indication of the UE capability not to trigger an RRC procedure(s) (signalling/ message) in the case of an insufficient flyover period.

The UE sends to the network an indication of the UE capability to wait for the next satellite coverage period (i.e. satellite fly-over time) before triggering an RRC procedure.

The UE sends to the network an indication of the UE capability to verify the remaining fly-over time from at least one satellite.

The UE sends to the network an indication of the UE capability to wait for the next satellite coverage period (i.e., satellite fly-over time) before triggering an RRC procedure.

The network configures a new UE behavior wherein the UE can determine (e.g., based on calculation and/or other assistance information received from the network) whether the UE has enough time to send the desired RRC message(s) and/or signalling.

The network configures the UE to not trigger an RRC signalling/message(s) if the UE determines that there is insufficient coverage time to complete a procedure (i.e., RRC signalling/message(s)) within the current fly-over period.

The network configures the UE to wait for the next fly-over time before initiating an RRC procedure (i.e., RRC signalling/message(s)), or determines not to attempt the RRC procedure in the current remaining flyover time, if the UE determines insufficient coverage time to complete this procedure (i.e., RRC signalling/message(s)) within the current fly-over period.

The UE may determine the remaining time before the start of the flyover period based on information received from the network (e.g., ephemeris and/or other assistance information related to coverage timing).

The UE may determine the remaining flyover time based on the UE's visibility of multiple satellite. In one alternative, the UE may select the coverage of the satellite with the longest flyover time optionally even if the conditions for selecting the satellite in terms of signalling strength, etc., are such that this satellite would not have been selected as a primary option, such as if another satellite should have been selected based on its signal strength. As such, the satellite selection may consider flyover time in addition to signal strength (or radio conditions).

UE and/or Network Behavior if the UE Deactivates its Access Stratum Function

This disclosure proposes solutions to avoid this problem and address the following question:

What is the UE behaviour if it deactivates its Access Stratum functions in order to optimise power consumption until coverage returns?

The UE which determines that there is insufficient time to trigger an RRC procedure, as described above, may decide to remain in the RRC_IDLE mode/state, move to RRC_IDLE mode/state, remain in its current RRC mode/ state, or perform any combination of these actions.

For example, assuming that the UE is in the RRC_IDLE mode, and the UE determined a case of insufficient flyover time to complete an RRC procedure, e.g., RRC Resume procedure or RRC setup procedure (or any other RRC procedure), the UE may not initiate the desired RRC procedure.

Figure 3A:
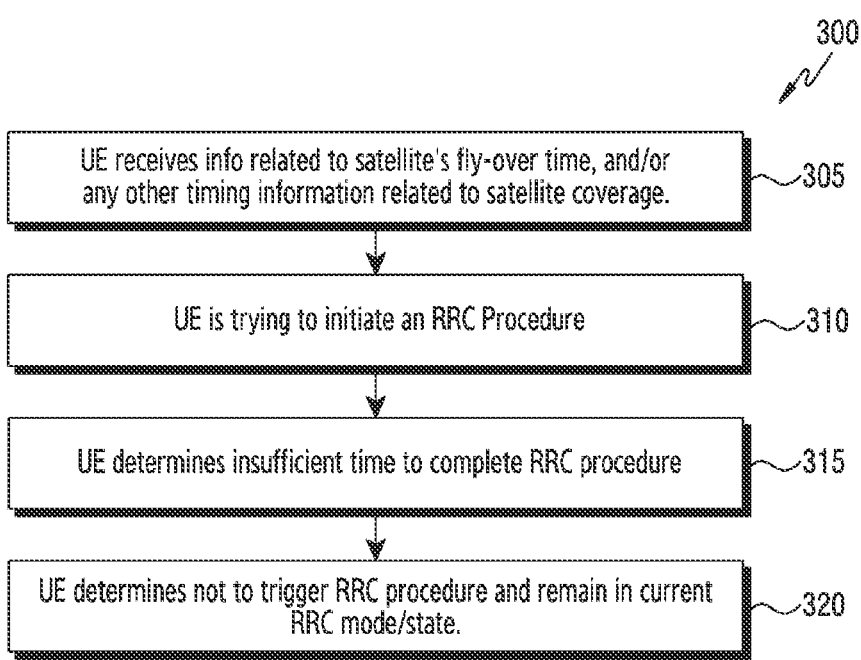
FIG. 3A illustrates a UE behavior depending on remaining satellite fly-over time according to an embodiment.

FIG. 3A illustrates a UE behavior 300 depending on remaining satellite fly-over time according to an embodiment. In step 305, the UE receives information related to satellite's fly-over time, and/or any other timing information related to satellite coverage.

In step 310, the UE begins an attempt to initiate an RRC procedure. For example, the UE is configured to determine whether to initiate the RRC procedure. As anther example, the UE is triggered to initiate the RRC procedure. The designated event for triggering the UE includes a case that there is data that the UE needs to transmit or receive.

In step 315, the UE determines there is insufficient flyover time to trigger the desired RRC procedure.

In step 320, the UE determines not to trigger the RRC procedure and decides to remain in its current RRC state (e.g., RRC_IDLE mode).

For example, the UE decides not to trigger RRC reestablishment, RRC Setup, RRCResume, (or any other RRC procedure, signalling/messages).

Figure 3B:
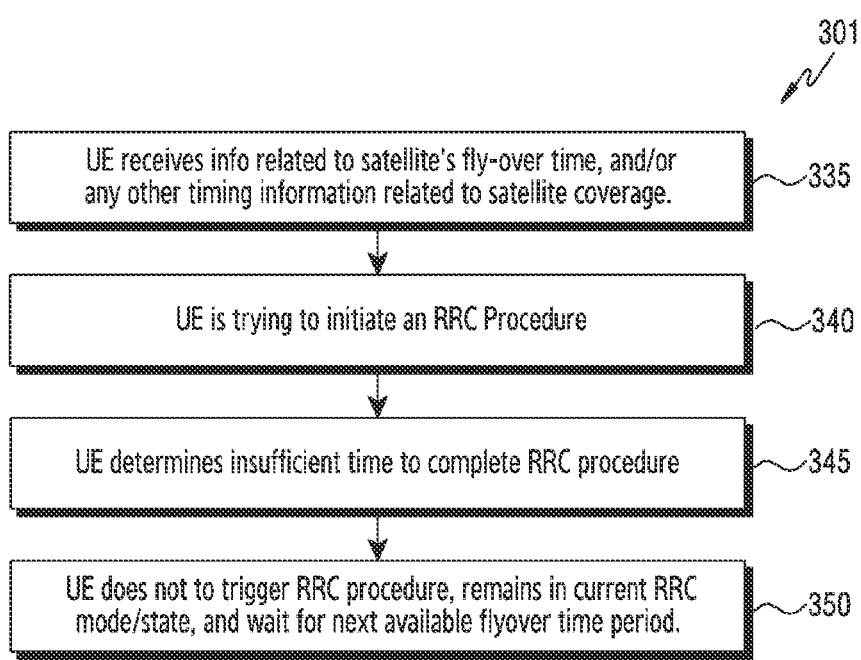
FIG. 3B illustrates a UE behavior depending on remaining satellite fly-over time according to an embodiment.

FIG. 3B illustrates a UE behavior 301 depending on remaining satellite fly-over time according to an embodiment. In step 335, the UE receives information related to satellite's fly-over time, and/or any other timing information related to satellite coverage.

In step 340, the UE begins an attempt to initiate an RRC procedure.

In step 345, the UE determines there is insufficient flyover time to trigger the desired RRC procedure.

In step 350, the UE decides to remain in its current RRC state (e.g., RRC_IDLE mode), and decides to trigger the RRC procedure in the next available fly-over time (or DC).

Figure 3C:
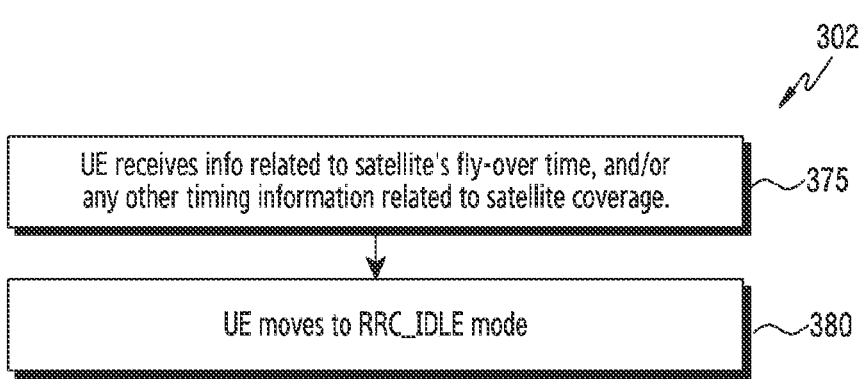
FIG. 3C illustrates a UE behavior depending on remaining satellite fly-over time according to an embodiment.

FIG. 3C illustrates a UE behavior 302 depending on remaining satellite fly-over time according to an embodiment. In step 375, the UE receives information related to satellite's fly-over time, and/or any other timing information related to satellite coverage.

In step 380, the UE moves to the RRC_IDLE mode due to expected event of loss of satellite coverage in order to avoid any sudden loss of data and/or signalling loss (e.g., event of of RLF).

For example, the UE in the RRC_CONNECTED mode or RRC_INACTIVE mode, upon determining there is insufficient remaining time to transmit or receive data and/or control signalling, decides to locally release its RRC connection (i.e., move to RRC_IDLE) or request its release from the network.

RRC Procedure Failure Due to Loss of Satellite Coverage

This disclosure proposes solutions to avoid this problem and address the following question:

What is the network behaviour when rejecting an RRC procedure request from the UE in the case of DC?

The UE may receive information related to satellite's flyover time and may determine that the remaining satellite fly over time is insufficient to complete a desired RRC procedure, which the UE intends to trigger.

The UE may ignore the insufficient flyover time, and proceed to initiate the RRC procedure. The UE may not determine the remaining satellite flyover time and may proceed to initiate the RRC procedure that is pending.

In one alternative, the UE may not receive any information related to timing of satellite coverage (e.g., flyover time), and proceed to initiate the RRC procedure. For example, the UE may send (e.g., RRC SetupRequest, RRC ReestablishmentRequest, RRCResumeRequest, etc.) without considering (or ignoring satellite flyover time, if available) to NG-RAN.

The UE may be configured to behave in a certain (default) manner when it cannot obtain and/or calculate the remaining flyover time (or the start of the next discontinuous coverage period), or when it cannot determine whether there is sufficient time to initiate a procedure. For example, the UE may not initiate the procedure when it cannot determine the remaining time or whether there is sufficient time, the UE may initiate the procedure even if cannot determine whether there is sufficient time, or when unable to determine whether there is sufficient time, the UE can initiate the RRC procedure if the related RRC timer is less than (or equal to) a known threshold. This threshold is either configured in the UE or received from the network. As such, the network may provide this threshold or configuration of UE behavior using dedicated or broadcast signalling.

To avoid excessive power consumption and unnecessary signalling overhead between the UE and the network, as a result of incomplete RRC procedures during a satellite's flyover time, it is disclosed that the NG-RAN should verify or determine whether there is sufficient time to complete the UE initiated RRC procedure. For example, the NG-RAN determines whether there is sufficient time for the RRC procedure to be completed before the related RRC timer expires, or verifies or determines whether there is sufficient time, i.e., a minimum time duration before the start of the next DC event.

For example, the NG-RAN determines there is sufficient time if the remaining duration of the flyover time is greater than or equal to the expected duration to complete the RRC procedure, and there is insufficient time if the remaining duration of the flyover time is smaller (or optionally equal to or smaller) than the expected duration to complete the RRC procedure.

The time to complete that procedure that is determined by the NG-RAN may involve determining whether there is sufficient time for an RRC message to be processed and/or for sending a response to the UE such that the response message may arrive before the loss of coverage (or before the start of the DC period).

The NG-RAN may reject the UE initiated RRC procedure if the NG-RAN verifies the case of insufficient satellite flyover time to complete this RRC procedure.

The NG-RAN rejects the UE initiated RRC procedure and provides a suitable new cause value for rejecting the connection. For example, NG-RAN may include a cause value "Insufficient Time to Complete Proc", "Insufficient NTN coverage Time", or any other suitable naming.

The UE considers the new cause value in the reject message and may not try to trigger RLF, or any other RRC procedure until, e.g., the next satellite's fly over time is available.

The NG-RAN may determine to reject the request if the NG-RAN determines that the RRC message would require processing such that the time to process and return a response message would be insufficient. This may be determined in the NG-RAN based on local configurations or may be per message type. As such, the NG-RAN may be configured to operate as described herein when certain messages are received where these messages (or procedures) may be known to require a certain minimum processing time and where the remaining flyover time may be insufficient for the processing and/or response.

FIG. 4 illustrates an NG-RAN behavior 400 according to an embodiment. The UE may be configured to operate as follows: if the UE detects a radio link failure and needs to initiate the procedure to re-establish the RRC connection, the UE would need to determine whether sufficient flyover time is available to complete the RRC procedure before initiating this procedure. For example, the UE determines whether remaining flyover time is sufficient to complete RRC re-establishment procedure.

If the UE determines insufficient flyover time to complete RRC re-establishment (or RRC Connection Re-establishment) procedure, the UE may not start the RRC connection re-establishment and may move/remain in the RRC_IDLE mode/state.

If the UE determines insufficient flyover time to complete RRC re-establishment (or RRC Connection Re-establishment) procedure, the UE may wait for the next available satellite's flyover time before attempting an RRC connection re-establishment.

The UE may ignore the insufficient flyover time and proceed to initiate the RRC re-establishment procedure. The UE may not determine the remaining satellite flyover time and may proceed to initiate the RRC re-establishment procedure that is pending.

In FIG. 4, in step 405, the UE receives information related to satellite's flyover time, and/or any other timing information related to satellite coverage.

In step 410, the UE initiates an RRC procedure without considering the remaining satellite flyover time.

The NG-RAN determines whether there is sufficient time to complete the RRC re-establishment procedure.

Specifically, in step 415, the NG-RAN may determine insufficient time to complete RRC re-establishment procedure.

In step 420, the NG-RAN may reject the procedure, if triggered by the UE, with a suitable error cause value.

That is, the NG-RAN may determine insufficient time to complete RRC re-establishment procedure and may reject/fail the procedure, if triggered by the UE, and optionally includes a new cause value (e.g., insufficientTimeToCompleteProc, etc.) and/or other assistant information (e.g., indication to UE to wait for the next (upcoming) satellite's flyover time, and/or other timing parameters) in the reject/failure/response message to the UE.

The NG-RAN may release the UE and optionally inform the network of the UE release.

The NG-RAN may release the UE and optionally inform the network of the UE release and include a suitable new cause value (e.g. insufficientTimeToCompleteProc, or other) for the reason to release the UE.

The above examples may also apply if the UE is attempting to recover from a handover failure.

The above examples may also apply if the UE is attempting to recover from another type of failure (e.g. failureType as t310-Expiry, t312-Expiry, lbt-Failure, randomAccess-Problem, rlc-MaxNumRetx, beamFailure, bh-RLF, rlc-failure, etc.).

When the UE (or the RRC layer) determines not to re-establish its RRC connection due to RLF, or due to other failures such as handover failure, the UE may enter RRC-IDLE state and may inform the upper layer (e.g., NAS) that it has entered RRC-IDLE state. The RRC layer may inform the upper layer (e.g. NAS) that the reason for entering is idle state is due to insufficient time for recovery or due to DC. Alternatively, the RRC layer, due to an intentional decision not to recover from RLF or other failure as described above, may not inform the upper layer (e.g., NAS) about any failure. As such, the UE should inform the upper layers (e.g., NAS) about an RLF if there is sufficient time to recover from the RLF or when the UE is not using satellite access. If the UE is using satellite access and determines that there is insufficient time to recover from the RLF, the UE does not inform the NAS about the failure.

Network Behavior Following UE Indication/Decision of Insufficient Flyover Time to Complete Procedures This disclosure proposes solutions to avoid this problem and address the following question:

What is the Network behavior if the UE informs the network that it needs to change RRC state (e.g. move to RRC IDLE) due to predicted loss of coverage?

The network may configure the UE to determine whether there is sufficient time for the UE to complete RRC procedure(s), before the UE initiates an RRC procedure. The network may configure the UE using any of existing and/or newly defined signalling/message.

The NG-RAN may configure the UE to determine whether sufficient flyover time is available to complete an RRC procedure, by sending a newly defined suitable IE in any suitable existing RRC message (e.g., RRC Release, RRC Reconfiguration, or any other RRC message/signalling).

The NG-RAN may send the indication to the UE to determine whether sufficient flyover period is available to complete an RRC procedure, using system information broadcast (e.g., periodically, on-demand, other). For example, the NG-RAN may broadcast in existing SIB or in a newly defined SIB, an indication (1 bit flag) that may be set as bit=1, where the UE determines the remaining flyover period (and/or any other timers related to RRC procedures), or as bit=0, where the UE does not determine the remaining flyover period (and/or any other timers related to RRC procedures).

Alternatively, the NG-RAN may configure the UE to perform RRC release if the UE determines that the flyover time is insufficient to complete an RRC procedure. For example, in any RRC message such as the RRC Release message, the NG-RAN may include a new parameter (e.g., uEReleaseInsufficientTime IE, uEReleaseInsufficientProcTime IE, or any other suitable naming).

If the uEReleaseInsufficientProcTime IE is included in an RRC message e.g. the RRCRelease message (or RRCRelease with a suspend configuration message), and uEReleaseInsufficientProcTime IE is set to TRUE, and UE determines that there is insufficient time to perform (or complete) an RRC procedure (RRCResume, RRCSetup, other), the UE may trigger its own RRC release or request an RRC release from the network (e.g. in order to release UE context in the network). The UE may also indicate to the network the reason/cause for triggering the release (e.g., new cause value, insufficientTimeToCompleteProc, failureToCompleteProc, uEReleaseFailureToCompleteProc, other suitable naming).

The network entity receiving the UE release indication (and/or the new cause/error value) may inform/forward the release request and/or the release cause to another network entity (e.g., UE sends to NG-RAN and NG-RAN forwards to AMF). The indication from the UE to the network may be carried using existing and/or newly defined signalling/messages.

A UE may determine whether sufficient time is available for completing an RRC procedure. A UE indicates to the network its capability to determine remaining flyover time (and/or any of the other timers discussed in this invention) to the network.

The UE which determines that there is insufficient flyover time as described above may deactivate its access stratum function, remain in the idle mode, enter the idle mode, stay in its current mode, or perform any combination of these actions.

The UE which determines that there is insufficient flyover time as described above may indicate to the network the preference to leave the RRC-CONNECTED state (or other state) and enter, e.g. idle mode, or inactive state (with a suspend indication).

The UE may indicate the reason for the preference to leave the RRC-CONNECTED mode/state (or other state) due to insufficient time to complete an RRC or NAS procedure.

For example, if the UE is configured to verify the remaining flyover time and indicates to the NG-RAN, its preference to leave the RRC-CONNECTED mode/state, the UE will include, e.g. a newly defined IE, insufficientTimeToCompleteProc IE to indicate the reason for the preference to leave RRC-CONNECTED mode/state.

Figure 5:
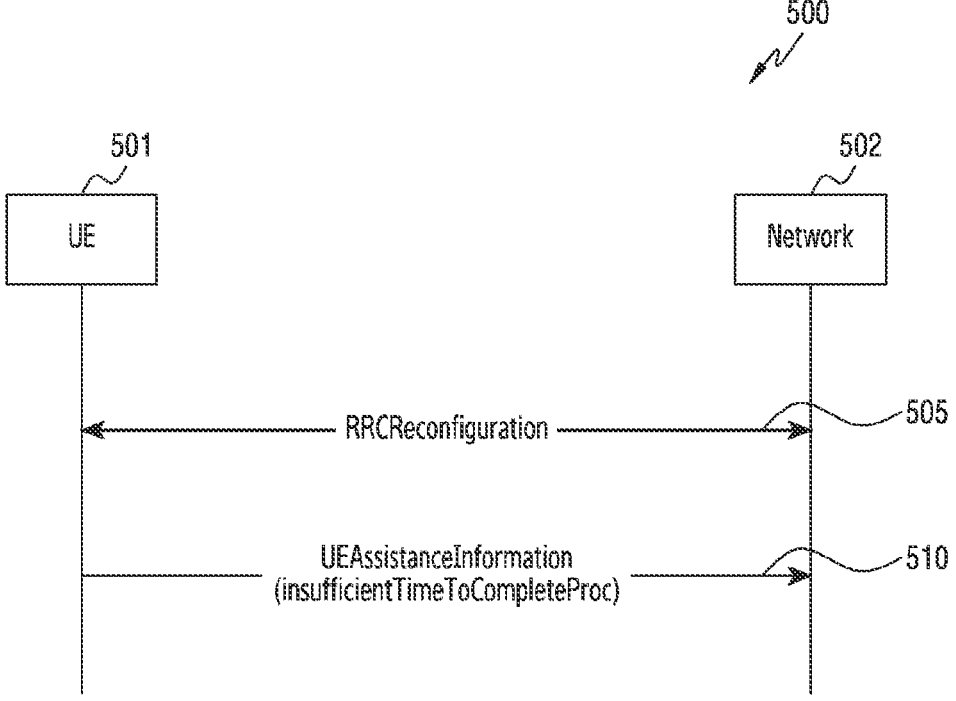
FIG. 5 illustrates a UE sending an indication to the network according to an embodiment.

FIG. 5 illustrates a UE sending an indication to the network 500 according to an embodiment. Specifically, FIG. 5 illustrates in step 505, an RRCReconfiguration performed between the UE 510 and network 502. In step 510, the UE 501 sends an indication insufficientTimeToCompleteProc information element (IE) to the network 502 (e.g. NG-RAN) for its preference to leave an RRC mode/state, and providing UE preference to move out of the RRC-CONNECTED state with the indication of the insufficientTimeToCompleteProc IE.

For example, the NG-RAN may trigger the UE Context Release Request procedure to request the AMF to release UE context and indicate the appropriate cause value for the release, e.g. insufficientTimeToCompleteProc or any other suitable naming.

Figure 6:
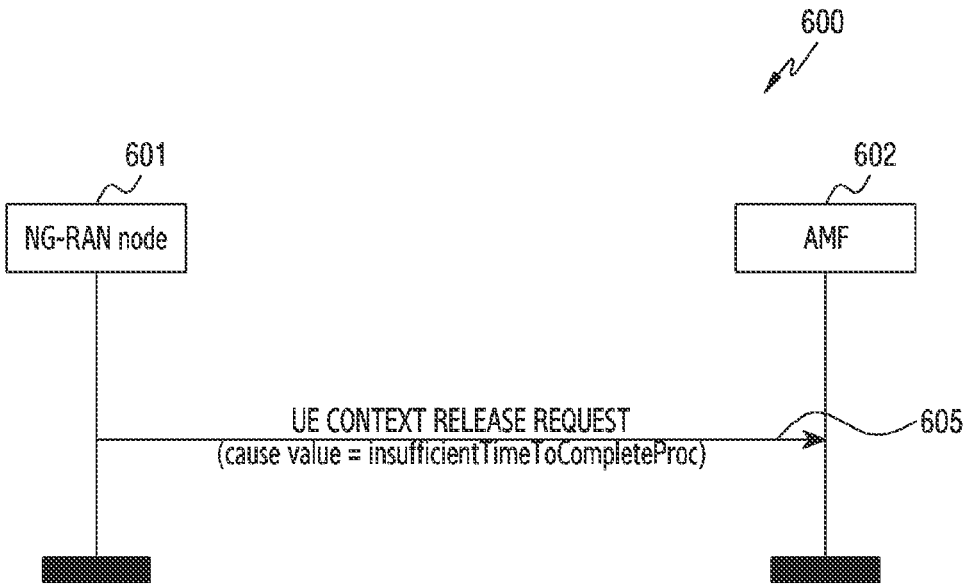
FIG. 6 illustrates an NG-RAN for transmitting a UE context release request message according to an embodiment.

FIG. 6 illustrates an NG-RAN for transmitting a UE context release request message 600 according to an embodiment. Specifically, in step 605, a new cause value=insufficientTimeToCompleteProc" is included in the UE context release request procedure to request the AMF 602 to release the UE context. FIG. 6 illustrates the new cause value "insufficientTimeToCompleteProc in the UE CONTEXT RELEASE REQUEST message (i.e. moving UE out of RRC_CONNECTED state) sent between the NG-RAN node 601 and the AMF 602.

Figure 7:
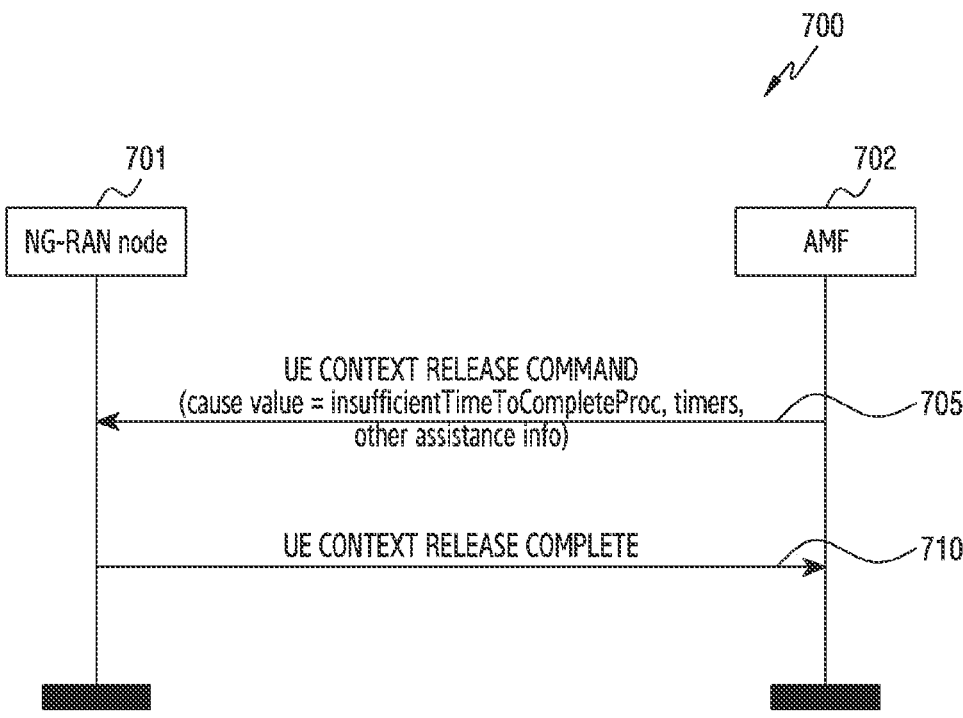
FIG. 7 illustrates an NG-RAN for transmitting a UE context release complete message according to an embodiment.
Figure 8:
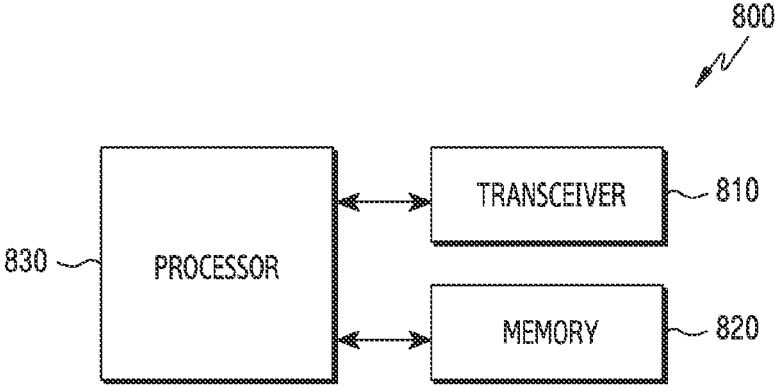
FIG. 8 illustrates a structure of a UE according to an embodiment.

FIG. 7 illustrates an NG-RAN for transmitting a UE context release complete message 700 according to an embodiment. Specifically, if the NG-RAN node 701 (or another NW entity or NW function) and/or the UE have (has) informed the AMF 702 that the UE is unable to complete RRC procedure(s) (e.g. due to insufficient flyover time), the AMF 702 may trigger the release of the UE context and indicate the suitable cause value, and/or assistance information (e.g. timers mentioned in inventions above, or scalled/updated values of those timers, or other suitable timers) to the UE, e.g in the UE CONTEXT RELEASE COMMAND message, as shown in FIG. 8. FIGS. 5 and 8 illustrate a new cause value "insufficientTimeToCompleteProc", and other assistance information in the UE CONTEXT RELEASE COMMAND message (i.e., moving UE out of RRC_CONNECTED state).

The disclosure may apply to NG-RAN, eNB, gNB and related RRC signaling/messages.

RAN2 (38.331):

5.7.4 UE Assistance Information

[ . . . ]

The purpose of the UE assistance information procedure is for the UE to inform the network of its preference to transition out of the RRC_CONNECTED state due to insufficient time for the UE to complete procedures.

5.7.4.2 Initiation

In terms of initiation, a UE capable of verifying remaining satellite flytime for completion of an RRC or NAS procedure, may provide assistance information for leave indication, and may initiate the procedure if it was configured to do so upon determining that it needs to leave RRC_CONNECTED state.

New Behavior for NG-RAN when Handling a NAS Message

This disclosure proposes solutions to avoid this problem and address the following question:

What is the Network behavior if it receives a NAS message to be forwarded to the core network but the discontinuous coverage is about to start?

The NG-RAN may be configured to receive an RRC message which includes an NAS message that should be forwarded to the core network (e.g. AMF or MME). The NG-RAN should determine whether there is sufficient time such that the NAS message can be forwarded to the core network (CN). If the NG-RAN determines that there is sufficient time, the NG-RAN should forward the message to the CN. If the NG-RAN determines that there is insufficient time, the NG-RAN should not forward the message to the CN and optionally the NG-RAN may discard the message from the UE or send a response message to the UE (e.g. any existing or new RRC message, where this may be a reject message) and optionally indicate that the reason for not forwarding the message to the CN. The NG-RAN may include the NAS message which was not forwarded to the CN, the NG-RAN may include this message in its response to the UE.

The NG-RAN may be preconfigured with a certain threshold, or certain value which represents the threshold of a remaining flyover time before DC, which is used to determine whether there is sufficient time to forward the NAS message to the CN or not. For example, if the remaining flyover time is greater than or equal to a known threshold, the NG-RAN may forward the NAS message to the CN. Otherwise, if the remaining flyover time is less than (or equal to) the known threshold, the NG-RAN does not forward the NAS message to the CN.

If the UE receives any RRC message with a cause code indicating that there is insufficient time, where any other value may be used, the RRC layer in the UE may indicate to the upper layer e.g. to the NAS, that there is insufficient time and/or that DC is imminent. The RRC layer may forward to the NAS layer any NAS message which may have been received from the NG-RAN where this NAS message was an NAS message that the NG-RAN did not forward to the CN (and the NG-RAN may have returned the NAS message to the UE).

The NG-RAN may be configured to operate as described above using operation and management, or preconfigured to behave as disclosed, or the CN may configure the NG-RAN to start (or stop) operating as described above. The NG-RAN may conclude operating as described above if any of the methods used to configure the NG-RAN is re-used such that the configuration indicates that the NG-RAN should not behave as disclosed herein.

The disclosure may apply to NG-RAN, eNB, gNB and related RRC signaling/messages.

Further disclosed herein is a UE in a communications network using a satellite to access the network, configured to perform the previously described methods.

The UE may be configured to perform the method when the UE is preconfigured to carry out the method, the network indicates its support for the UE to perform the method, where this support may be an explicit indication or an implicit indication where the network provides the remaining time period or the minimum time period to the UE, or a user manually changes the settings on the UE to perform the method.

The same methods herein may also be used to configure the UE to stop operating as described herein.

A method performed by a base station in a wireless communication system is provided. The method comprises identifying that a user equipment (UE) is out of a coverage of a satellite due to a discontinuous coverage (DC) and transmitting, to a network entity managing a mobility of the UE, a UE context release request message including a cause value for a UE context release.

The cause value indicates that the UE context release is due to the DC of the satellite.

The base station is evolved Node B (eNB) and the network entity is a mobility management entity (MME).

The method further comprises identifying whether a minimum time for completing a radio resource control (RRC) procedure exists before a start of the DC, in case that the minimum time does not exist, rejecting the RRC procedure, and in case that the minimum time exists, transmitting, to the network entity, an RRC message for the RRC procedure.

The method further comprises identifying whether a minimum time for transmitting a non-access stratum (NAS) message exists before a start of the DC, in case that the minimum time does not exist, discarding the NAS message and in case that the minimum time exists, transmitting, to the network entity, the NAS message.

A base station in a wireless communication system is provided. The base station comprises a transceiver and a controller coupled with the transceiver and configured to identify that a user equipment (UE) is out of a coverage of a satellite due to a discontinuous coverage (DC) and transmit, to a network entity managing a mobility of the UE, a UE context release request message including a cause value for a UE context release.

The cause value indicates that the UE context release is due to the DC of the satellite.

The base station is evolved Node B (eNB) and the network entity is a mobility management entity (MME).

The controller is further configured to identify whether a minimum time for completing a radio resource control (RRC) procedure exists before a start of the DC, in case that the minimum time does not exist, reject the RRC procedure and in case that the minimum time exists, transmit, to the network entity, an RRC message for the RRC procedure.

The controller is further configured to identify whether a minimum time for transmitting a non-access stratum (NAS) message exists before a start of the DC, in case that the minimum time does not exist, discard the NAS message and in case that the minimum time exists, transmit, to the network entity, the NAS message.

A method performed by a network entity managing a mobility of a user equipment (UE) in a wireless communication system is provided. The method comprises in case that the UE is out of a coverage of a satellite due to a discontinuous coverage (DC) and receiving, from a base station, a UE context release request message including a cause value for a UE context release.

The cause value indicates that the UE context release is due to the DC of the satellite.

The base station is evolved Node B (eNB) and the network entity is a mobility management entity (MME).

The method further comprises in case that a minimum time for a radio resource control (RRC) procedure exists before a start of the DC, receiving, from the base station, an RRC message for the RRC procedure.

The method further comprises in case that a minimum time for a non-access stratum (NAS) procedure exists before a start of the DC, receiving, from the base station, a NAS message.

A network entity managing a mobility of a user equipment (UE) in a wireless communication system is provided. The network entity comprises a transceiver and a controller coupled with the transceiver and configured to in case that the UE is out of a coverage of a satellite due to a discontinuous coverage (DC), receive, from a base station, a UE context release request message including a cause value for a UE context release.

The cause value indicates that the UE context release is due to the DC of the satellite.

The base station is evolved Node B (eNB) and the network entity is a mobility management entity (MME).

The controller is further configured to, in case that a minimum time for a radio resource control (RRC) procedure exists before a start of the DC, receive, from the base station, an RRC message for the RRC procedure.

The controller is further configured to, in case that a minimum time for a non-access stratum (NAS) procedure exists before a start of the DC, receive, from the base station, a NAS message.

A method of a radio access network (RAN) entity in a communications network, wherein a user equipment is provided. The UE uses at least one satellite to access the communications network, and wherein satellite coverage is discontinuous. The method comprises identifying loss of satellite coverage for the UE and in response to identifying loss of satellite coverage for the UE, releasing the UE.

The RAN entity is an eNB, and wherein releasing the UE comprises initiating a UE context release request procedure with the serving mobility management entity (MME).

The RAN entity is a gNB or NG-RAN, and wherein releasing the UE comprises initiating a UE context release request procedure with the access and mobility management function (AMF).

Initiating the UE context release request procedure comprises indicating that the cause of the UE release is at least one of: release due to discontinuous coverage, insufficient time to complete a procedure, loss of satellite coverage, insufficient flyover time and a start of a discontinuous coverage period.

Releasing the UE comprises releasing the UE through at least one of existing or newly defined dedicated signalling to the UE or existing or newly defined system information broadcast.

The dedicated signalling comprises a radio resource control (RRC) release message, and the RRC release message comprises a newly defined information element.

Releasing the UE comprises indicating that the cause of the UE release is at least one of release due to discontinuous coverage, insufficient time to complete a procedure, loss of satellite coverage; insufficient flyover time and a start of a discontinuous coverage period.

The method further comprises informing the communications network of the release. Informing the communications network of the release comprises indicating that the cause of the UE release is at least one of release due to discontinuous coverage, insufficient time to complete a procedure, loss of satellite coverage, insufficient flyover time and a start of a discontinuous coverage period.

Informing the communications network of the release comprises informing the UE of the release, and indicating to the UE that the cause of the UE release is at least one of release due to discontinuous coverage, insufficient time to complete a procedure, loss of satellite coverage, insufficient flyover time and a start of a discontinuous coverage period.

A method of a radio access network (RAN) entity in a communications network, wherein a user equipment is provided. The UE uses at least one satellite to access the communications network. The method comprises transmitting information to the UE, wherein the information enables the UE to determine at least one of loss of satellite coverage, start of discontinuous coverage, or remaining flyover time.

The information is transmitted through at least one of existing or newly defined dedicated signalling or existing or newly defined system information.

The dedicated signalling comprises a radio resource control (RRC) release message, and the RRC release message comprises a newly defined information element.

The method further comprises receiving, from the UE, information about a UE capability. The UE capability comprises at least one of a capability to determine a remaining satellite flyover time of a satellite, a capability to support multiple satellites, a capability to determine remaining satellite flyover times of multiple satellites, a capability to handle any updated values or extensions of radio resource control (RRC) procedures timers that may be impacted by discontinuous coverage scenarios, a capability not to trigger an RRC procedure in case of insufficient flyover period, a capability to wait for the next satellite coverage period before triggering an RRC procedure.

A radio access network (RAN) entity configured to carry out the method of the above illustrated description.

A method of a user equipment (UE) in a communications network is provided. The UE uses at least one satellite to access the communications network, and wherein satellite coverage is discontinuous. The method comprises identifying loss of satellite coverage.

Identifying loss of satellite coverage comprises at least one of determining a start time of discontinuous coverage of the satellite and determining a remaining time before discontinuous coverage of the satellite.

The method further comprises verifying if there is sufficient time to complete a radio resource control (RRC) procedure based on at least one of the determined start time and the determined remaining time.

The method further comprises receiving information from a radio access network (RAN) entity and identifying loss of satellite coverage based on the information.

The information is received through at least one of existing or newly defined dedicated signalling or existing or newly defined system information.

The method further comprises based on identifying loss of satellite coverage, releasing a radio resource control (RRC) connection.

The method further comprises indicating, to the communications network, information about a UE capability. The UE capability comprises at least one of a capability to determine a remaining satellite flyover time of a satellite, a capability to support multiple satellites, a capability to determine remaining satellite flyover times of multiple satellites, a capability to handle any updated values (or extensions) of radio resource control (RRC) procedures timers that may be impacted by discontinuous coverage scenarios, a capability not to trigger an RRC procedure in case of insufficient flyover period and a capability to wait for the next satellite coverage period before triggering an RRC procedure.

The method further comprises determining a remaining flyover time for each of a plurality of satellites and selecting a satellite with the largest remaining flyover time among the plurality of satellites to initiate a radio resource control (RRC) procedure with.

A user equipment (UE) configured to carry out the method of the above illustrated description.

According to a third aspect of the present disclosure there is provided a communications network comprising a UE according to the second aspect and a core, the UE using the method according to the first aspect to access the satellite to access the core.

Disclosed is a method of a radio access network (RAN) entity in a communications network, wherein a user equipment, (UE) uses at least one satellite to access the communications network, and wherein satellite coverage is discontinuous, the method comprising identifying loss of satellite coverage for the UE; and in response to identifying loss of satellite coverage for the UE, releasing the UE. Also disclosed is a method of a RAN entity in the communications network, the method comprising transmitting information to the UE, wherein the information enables the UE to determine loss of satellite coverage or start of discontinuous coverage. Also disclosed is a method of a UE in the communications network, the method comprising identifying loss of satellite coverage. Further disclosed are a RAN entity and UE configured to carry out the methods.

FIG. 8 illustrates a structure of a UE according to an embodiment.

As shown in FIG. 8, the UE may include a transceiver 810, a memory 820, and a processor 830. The transceiver 810, the memory 820, and the processor 830 of the UE may operate according to a communication method of the UE described above. However, the components of the UE are not limited thereto. For example, the UE may include more or fewer components than those described above. In addition, the processor 830, the transceiver 810, and the memory 820 may be implemented as a single chip, and the processor 830 may include at least one processor.

The transceiver 810 collectively refers to a UE receiver and a UE transmitter, and may transmit/receive a signal to/from a base station or a network entity, where the signal may include control information and data. The transceiver 810 may include a RF transmitter for up-converting and amplifying a frequency of a transmitted signal, and a RF receiver for amplifying low-noise and down-converting a frequency of a received signal. However, this is only an example of the transceiver 810 and components of the transceiver 810 are not limited to the RF transmitter and the RF receiver.

The transceiver 810 may receive and output, to the processor 830, a signal through a wireless channel, and transmit a signal output from the processor 830 through the wireless channel.

The memory 820 may store a program and data required for operations of the UE. Also, the memory 820 may store control information or data included in a signal obtained by the UE. The memory 820 may be a storage medium, such as read-only memory (ROM), random access memory (RAM), a hard disk, a CD-ROM, and a digital versatile disc (DVD), or a combination of storage media.

The processor 830 may control a series of processes such that the UE operates as described above. For example, the transceiver 810 may receive a data signal including a control signal transmitted by the base station or the network entity, and the processor 830 may determine a result of receiving the control signal and the data signal transmitted by the base station or the network entity.

Figure 9:
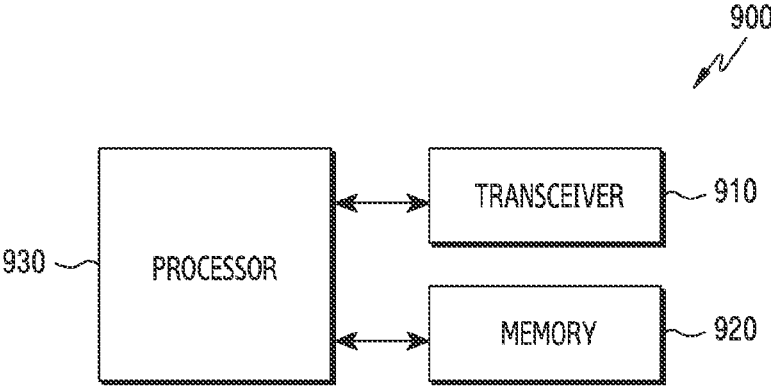
FIG. 9 illustrates a structure of a base station according to an embodiment.

FIG. 9 illustrates a structure of a base station according to an embodiment.

As shown in FIG. 9, the base station 900 may include a transceiver 910, a memory 920, and a processor 930. The transceiver 910, the memory 920, and the processor 930 of the base station may operate according to a communication method of the base station described above. However, the components of the base station are not limited thereto. For example, the base station may include more or fewer components than those described above. In addition, the processor 930, the transceiver 910, and the memory 920 may be implemented as a single chip. Also, the processor 930 may include at least one processor. Furthermore, the base station of FIG. 9 corresponds to base station of FIG. 1 to FIG. 10.

The transceiver 910 collectively refers to a base station receiver and a base station transmitter, and may transmit/receive a signal to/from a UE or a network entity. The signal transmitted or received to or from the terminal or a network entity may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

The transceiver 910 may receive and output, to the processor 930, a signal through a wireless channel, and transmit a signal output from the processor 930 through the wireless channel.

The memory 920 may store a program and data required for operations of the base station. The memory 920 may store control information or data included in a signal obtained by the base station. The memory 920 may be a storage medium, such as ROM, RAM, a hard disk, a CD-ROM, and a DVD, or a combination of storage media.

The processor 930 may control a series of processes such that the base station operates as described above. For example, the transceiver 910 may receive a data signal including a control signal transmitted by the terminal, and the processor 930 may determine a result of receiving the control signal and the data signal transmitted by the terminal.

Figure 10:
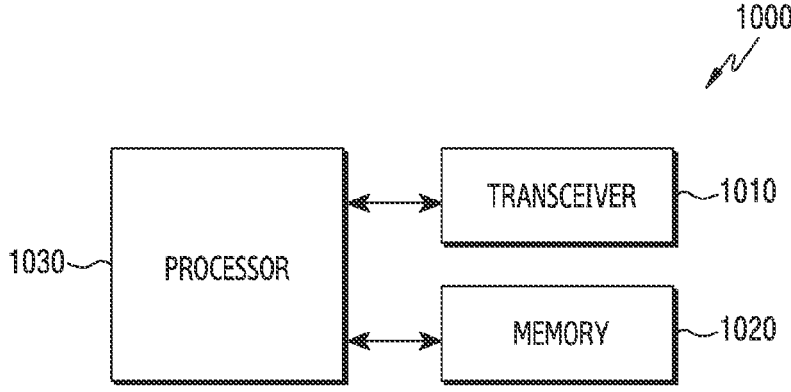
FIG. 10 illustrates a structure of a network entity according to an embodiment.

FIG. 10 illustrates a structure of a network entity according to an embodiment.

As shown in FIG. 10, the network entity of the present disclosure may include a transceiver 1010, a memory 1020, and a processor 1030. The transceiver 1010, the memory 1020, and the processor 1030 of the network entity may operate according to a communication method of the network entity described above. However, the components of the terminal are not limited thereto. For example, the network entity may include more or fewer components than those described above. In addition, the processor 1030, the transceiver 1010, and the memory 1020 may be implemented as a single chip. Also, the processor 1030 may include at least one processor.

For example, the network entity of FIG. 10 corresponds to the AMF or MME of FIG. 1 to FIG. 10.

The transceiver 1010 collectively refers to a network entity receiver and a network entity transmitter, and may transmit/receive a signal to/from a base station or a UE. The signal transmitted or received to or from the base station or the UE may include control information and data. In this regard, the transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

The transceiver 1010 may receive and output, to the processor 1030, a signal through a wireless channel, and transmit a signal output from the processor 1030 through the wireless channel.

The memory 1020 may store a program and data required for operations of the network entity. Also, the memory 1020 may store control information or data included in a signal obtained by the network entity. The memory 1020 may be a storage medium, such as ROM, RAM, a hard disk, a CD-ROM, and a DVD, or a combination of storage media.

The processor 1030 may control a series of processes such that the network entity operates as described above. For example, the transceiver 1010 may receive a data signal including a control signal, and the processor 1030 may determine a result of receiving the data signal.

As described above, a method performed by a base station in a wireless communication system includes identifying that a UE is out of a coverage of a satellite due to a DC and transmitting, to a network entity managing a mobility of the UE, a UE context release request message including a cause value for a UE context release.

The cause value indicates that the UE context release is due to the DC of the satellite.

The method further includes identifying whether a minimum time for completing a radio resource control (RRC) procedure exists before a start of the DC, in case that the minimum time does not exist, rejecting the RRC procedure, and in case that the minimum time exists, transmitting, to the network entity, an RRC message for the RRC procedure.

The method further includes identifying whether a minimum time for transmitting a non-access stratum message exists before a start of the DC, in case that the minimum time does not exist, discarding the NAS message and in case that the minimum time exists, transmitting, to the network entity, the NAS message.

As described above, a base station in a wireless communication system includes a transceiver and a controller coupled with the transceiver and configured to identify that a UE is out of a coverage of a satellite due to a DC and transmit, to a network entity managing a mobility of the UE, a UE context release request message including a cause value for a UE context release.

The cause value indicates that the UE context release is due to the DC of the satellite.

The controller is further configured to identify whether a minimum time for completing an RRC procedure exists before a start of the DC, in case that the minimum time does not exist, reject the RRC procedure and in case that the minimum time exists, transmit, to the network entity, an RRC message for the RRC procedure.

The controller is further configured to identify whether a minimum time for transmitting an NAS message exists before a start of the DC, in case that the minimum time does not exist, discard the NAS message and in case that the minimum time exists, transmit, to the network entity, the NAS message.

As described above, a method performed by a network entity managing a mobility of a UE includes, in case that the UE is out of a coverage of a satellite due to a DC and receiving, from a base station, a UE context release request message including a cause value for a UE context release.

The cause value indicates that the UE context release is due to the DC of the satellite.

The method further includes in case that a minimum time for an RRC procedure exists before a start of the DC, receiving, from the base station, an RRC message for the RRC procedure.

The method further includes in case that a minimum time for an NAS procedure exists before a start of the DC, receiving, from the base station, an NAS message.

As described above, a network entity managing a mobility of a UE includes a transceiver and a controller coupled with the transceiver and configured to in case that the UE is out of a coverage of a satellite due to a DC, receive, from a base station, a UE context release request message including a cause value for a UE context release.

The cause value indicates that the UE context release is due to the DC of the satellite.

The controller is further configured to, in case that a minimum time for an RRC procedure exists before a start of the DC, receive, from the base station, an RRC message for the RRC procedure.

The controller is further configured to, in case that a minimum time for an NAS procedure exists before a start of the DC, receive, from the base station, an NAS message.

As described above, a method of a RAN entity in a communications network, wherein a user equipment is provided. The UE uses at least one satellite to access the communications network, and wherein satellite coverage is discontinuous. The method includes identifying loss of satellite coverage for the UE and in response to identifying loss of satellite coverage for the UE, releasing the UE.

The RAN entity is an eNB, and wherein releasing the UE includes initiating a UE context release request procedure with the serving an MME.

The RAN entity is a gNB or NG-RAN, and wherein releasing the UE includes initiating a UE context release request procedure with the AMF.

Initiating the UE context release request procedure includes indicating that the cause of the UE release is at least one of: release due to discontinuous coverage, insufficient time to complete a procedure, loss of satellite coverage, insufficient flyover time and a start of a discontinuous coverage period.

Releasing the UE includes releasing the UE through at least one of existing or newly defined dedicated signalling to the UE or existing or newly defined system information broadcast.

The dedicated signalling includes an RRC release message, and the RRC release message includes a newly defined information element.

Releasing the UE includes indicating that the cause of the UE release is at least one of release due to discontinuous coverage, insufficient time to complete a procedure, loss of satellite coverage; insufficient flyover time and a start of a discontinuous coverage period.

The method further includes informing the communications network of the release. Informing the communications network of the release includes indicating that the cause of the UE release is at least one of release due to discontinuous coverage, insufficient time to complete a procedure, loss of satellite coverage, insufficient flyover time and a start of a discontinuous coverage period.

Informing the communications network of the release includes informing the UE of the release, and indicating to the UE that the cause of the UE release is at least one of release due to discontinuous coverage, insufficient time to complete a procedure, loss of satellite coverage, insufficient flyover time and a start of a discontinuous coverage period.

A method of a RAN entity in a communications network, wherein a user equipment is provided. The UE uses at least one satellite to access the communications network. The method includes transmitting information to the UE, wherein the information enables the UE to determine at least one of loss of satellite coverage, start of discontinuous coverage, or remaining flyover time.

The information is transmitted through at least one of existing or newly defined dedicated signalling or existing or newly defined system information.

The dedicated signalling includes an RRC release message, and the RRC release message includes a newly defined information element.

The method further includes receiving, from the UE, information about a UE capability. The UE capability includes at least one of a capability to determine a remaining satellite flyover time of a satellite, a capability to support multiple satellites, a capability to determine remaining satellite flyover times of multiple satellites, a capability to handle any updated values or extensions of radio resource control (RRC) procedures timers that may be impacted by discontinuous coverage scenarios, a capability not to trigger an RRC procedure in case of insufficient flyover period, a capability to wait for the next satellite coverage period before triggering an RRC procedure.

As described above, a method of a UE in a communications network is provided. The UE uses at least one satellite to access the communications network, and wherein satellite coverage is discontinuous. The method includes identifying loss of satellite coverage.

Identifying loss of satellite coverage includes at least one of determining a start time of discontinuous coverage of the satellite and determining a remaining time before discontinuous coverage of the satellite.

The method further includes verifying if there is sufficient time to complete an RRC procedure based on at least one of the determined start time and the determined remaining time.

The method further includes receiving information from a RAN entity and identifying loss of satellite coverage based on the information.

The information is received through at least one of existing or newly defined dedicated signalling or existing or newly defined system information.

The method further includes based on identifying loss of satellite coverage, releasing an RRC connection.

The method further includes indicating, to the communications network, information about a UE capability. The UE capability includes at least one of a capability to determine a remaining satellite flyover time of a satellite, a capability to support multiple satellites, a capability to determine remaining satellite flyover times of multiple satellites, a capability to handle any updated values (or extensions) of RRC procedures and timers that may be impacted by discontinuous coverage scenarios, a capability not to trigger an RRC procedure in case of insufficient flyover period and a capability to wait for the next satellite coverage period before triggering an RRC procedure.

The method further includes determining a remaining flyover time for each of a plurality of satellites and selecting a satellite with the largest remaining flyover time among the plurality of satellites to initiate RRC procedure with a UE configured to carry out the method of the above illustrated description.

As described above, there is provided a communications network comprising a UE according to the second aspect and a core, the UE using the method according to the first aspect to access the satellite to access the core.

Disclosed is a method of a RAN entity in a communications network, wherein a user equipment, (UE) uses at least one satellite to access the communications network, and wherein satellite coverage is discontinuous, the method comprising identifying loss of satellite coverage for the UE; and in response to identifying loss of satellite coverage for the UE, releasing the UE. There is disclosed is a method of a RAN entity in the communications network, the method comprising transmitting information to the UE, wherein the information enables the UE to determine loss of satellite coverage or start of discontinuous coverage. Also disclosed is a method of a UE in the communications network, the method comprising identifying loss of satellite coverage. Further disclosed are a RAN entity and UE configured to carry out the methods.

There is provided a method for a UE in a communications network using a satellite to access the network, the method comprising verifying if a communication process between the UE and the satellite can be completed before expiration of a flyover time of the satellite or cannot be completed before expiration of a flyover time of the satellite.

There is provided the method in which the communication process is a process initiated by the UE.

There is provided a method in which the communication process is a process initiated by the UE on receipt of a message from the network.

There is provided a method in which the communication process includes any of an NAS procedure, an RRC procedure.

There is provided a method in which the NAS procedure is any of an NAS message, an NAS request, NAS signalling and the RRC procedure is any of an RRC message, an RRC request, RRC signalling.

There is provided a method in which completion of the communication process before expiration of the flyover time of the satellite includes the UE transmitting a message to the network.

There is provided a method in which completion of the communication process before expiration of the flyover time of the satellite further includes the UE receiving an expected response message from the network.

There is provided a method including determining whether the communication process can or cannot be completed before expiration of a flyover time of the satellite by using at least one time value.

There is provided a method in which the time value includes a time period before an NAS timer expires.

There is provided a method in which the time value includes a remaining time period between a current time and an expiration time of the flyover time.

There is provided a method in which the time value includes a time period for completion of the communication process.

There is provided a method including determining that the communication process can be completed before expiration of a flyover time of the satellite by determining that the time value comprising the remaining time period is greater than the time value comprising the time period for completion of the communication process.

There is provided a method in which the time period for completion of the communication process includes a time period between a start of a communication procedure and an end of the communication procedure of the communication process.

There is provided a method in which the time period for completion of the communication process further includes a time period for the UE to be in a state which permits start of the communication procedure.

There is provided a method in which the time period for the UE to be in a state which permits start of the communication procedure is zero if the UE is already in a state which permits the UE to start the communication procedure.

There is provided a method in which the time period for the UE to be in a state which permits start of the communication procedure is non-zero and the method includes determining the non-zero time period for the UE to be in a state which permits start of the communication procedure.

There is provided a method in which the time value may comprise a minimum time period.

There is provided a method including determining that the communication process can be completed before expiration of a flyover time of the satellite by determining that the time value comprising the remaining time period is greater than or equal to the time value comprising the minimum time period.

There is provided a method in which the minimum time period is received by the UE from the network.

There is provided a method in which the minimum time period is received by the UE from the network in any of an NAS message, a container, a policy container, a part of steering information, a part of roaming information, an information element (IE).

There is provided a method in which the minimum time period is part of the UE subscription information.

There is provided a method in which the minimum time period is determined by the UE.

Examples of the present disclosure provide a computer program comprising instructions which, when the program is executed by a computer or processor, cause the computer or processor to carry out a method according to any example, embodiment, aspect and/or claim disclosed herein.

Examples of the present disclosure provide a computer or processor-readable data carrier having stored thereon a computer program according to the preceding examples.

Examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g., a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Embodiments of the present disclosure provide a machine-readable storage storing such a program.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a base station in a wireless communication system, the method comprising:

identifying whether a discontinuous coverage for a user equipment (UE) is started;

in case that the discontinuous coverage for the UE is started:

identifying that the UE is out of a coverage associated with non-terrestrial networks due to the discontinuous coverage;

transmitting, to a network entity managing a mobility of the UE, a UE context release request message including a cause value for a release of a connection of the UE, wherein the cause value indicates that the release is due to the discontinuous coverage; and transmitting, to the UE, a radio resource control (RRC) release message, and in case that the discontinuous coverage is not started:

identifying whether a minimum time for completing an RRC procedure exists before a start of the discontinuous coverage;

rejecting the RRC procedure in case that the minimum time does not exist; and transmitting, to the network entity, an RRC message for the RRC procedure in case that the minimum time exists.

2. The method of claim 1, wherein the base station is an evolved universal terrestrial radio access network Node B (eNB) and the network entity is a mobility management entity (MME).

3. The method of claim 1, further comprising:

in case that the discontinuous coverage is not started, identifying whether a minimum time for transmitting a non-access stratum (NAS) message exists before the start of the discontinuous coverage;

discarding the NAS message in case that the minimum time for transmitting the NAS message does not exist; and transmitting, to the network entity, the NAS message in case that the minimum time for transmitting the NAS message exists.

4. A base station in a wireless communication system, the base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

identify whether a discontinuous coverage for a user equipment (UE) is started, in case that the discontinuous coverage for the UE is started:

identify that the UE is out of a coverage associated with non-terrestrial networks due to the discontinuous coverage, transmit, to a network entity managing a mobility of the UE, a UE context release request message including a cause value for a release of a connection of the UE, wherein the cause value indicates that the release is due to the discontinuous coverage, and transmit, to the UE, a radio resource control (RRC) release message, and in case that the discontinuous coverage is not started:

identify whether a minimum time for completing an RRC procedure exists before a start of the discontinuous coverage, reject the RRC procedure in case that the minimum time does not exist, and transmit, to the network entity, an RRC message for the RRC procedure in case that the minimum time exists.

5. The base station of claim 4, wherein the base station is an evolved universal terrestrial radio access network Node B (eNB) and the network entity is a mobility management entity (MME).

6. The base station of claim 4, wherein the instructions further cause the base station to:

in case that the discontinuous coverage is not started, identify whether a minimum time for transmitting a non-access stratum (NAS) message exists before the start of the discontinuous coverage, discard the NAS message in case that the minimum time for transmitting the NAS message does not exist, and transmit, to the network entity, the NAS message in case that the minimum time for transmitting the NAS message exists.

* * * * *